United States Patent
Huang et al.

(10) Patent No.: US 7,852,556 B2
(45) Date of Patent: Dec. 14, 2010

(54) TOTAL INTERNAL REFLECTION FRESNEL LENS SYSTEMS, ASSEMBLIES, AND METHODS

(75) Inventors: Yu Huang, Los Angeles, CA (US);
Adnan Malik, Los Angeles, CA (US)

(73) Assignee: Luminoz, Inc., Tokyo (JP)

( * ) Notice: Subject to any disclaimer, the term of this patent is extended or adjusted under 35 U.S.C. 154(b) by 459 days.

(21) Appl. No.: 11/810,489

(22) Filed: Jun. 6, 2007

(65) Prior Publication Data
US 2007/0297051 A1    Dec. 27, 2007

Related U.S. Application Data

(63) Continuation-in-part of application No. 11/171,070, filed on Jun. 30, 2005, now Pat. No. 7,230,758.

(60) Provisional application No. 60/585,621, filed on Jul. 6, 2004.

(51) Int. Cl.
*G03B 21/60* (2006.01)
*G03B 21/56* (2006.01)

(52) U.S. Cl. .................. 359/457; 359/459; 359/460

(58) Field of Classification Search .......... 359/457, 359/459, 460, 443, 454–456
See application file for complete search history.

(56) References Cited

U.S. PATENT DOCUMENTS

| | | | |
|---|---|---|---|
| 4,531,812 A | 7/1985 | Oguino | |
| 5,870,224 A | 2/1999 | Saitoh et al. | |
| 6,072,551 A * | 6/2000 | Jannson et al. | 349/64 |
| 6,307,675 B1 * | 10/2001 | Abe et al. | 359/457 |
| 6,407,860 B1 | 6/2002 | Funazaki et al. | |
| 6,726,859 B2 | 4/2004 | Suzuki et al. | |
| 6,989,929 B2 | 1/2006 | Watanabe | |
| 2005/0046939 A1 | 3/2005 | Yoshikawa et al. | |
| 2006/0139749 A1 | 6/2006 | Watanabe et al. | |

* cited by examiner

*Primary Examiner*—Georgia Y Epps
*Assistant Examiner*—Magda Cruz
(74) *Attorney, Agent, or Firm*—Pillsbury Winthrop Shaw Pittman LLP

(57) ABSTRACT

Off-axis total internal reflection Fresnel lenses and projection screens are disclosed that, when combined, enable construction of projection assemblies for rear-projection-type screen devices (e.g., projection television systems) that are thinner, provide easier handling and maintenance, and have improved contrast, focusing, and resolution when compared with conventional projection screen devices. The off-axis Fresnel lens comprises a plurality of concentric, outwardly-extending, total internal reflection-type prism facets, the top side of which may be aspherical. Embodiments of the invention also include projection screens having at least one diffuser and one lenticular lens. In addition, one or more opaque layers may be used to improve contrast. The various components, e.g., the fresnel lens, the diffuser, the lenticular lens(es), the opaque layer(s), etc. are all combined, or connected, in such a way as to eliminate substantially all air gaps within the connections.

11 Claims, 29 Drawing Sheets

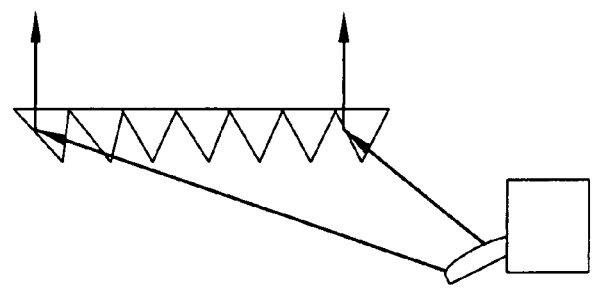
FIG.10(c)
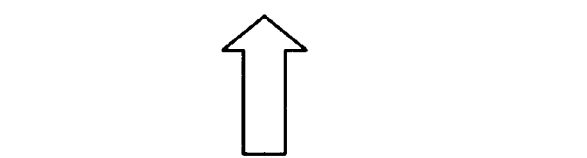
FIG.10(b)
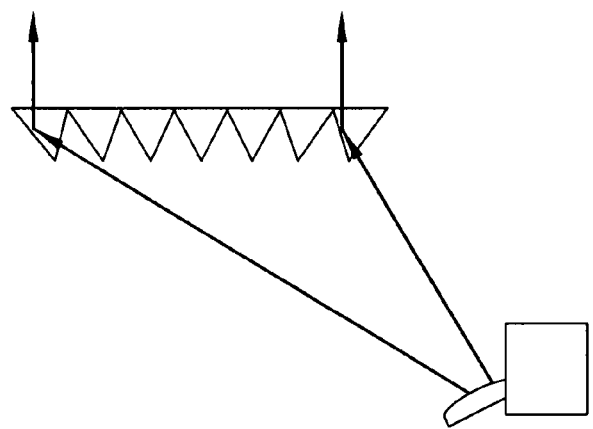
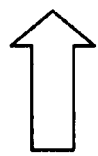
FIG.10(a)

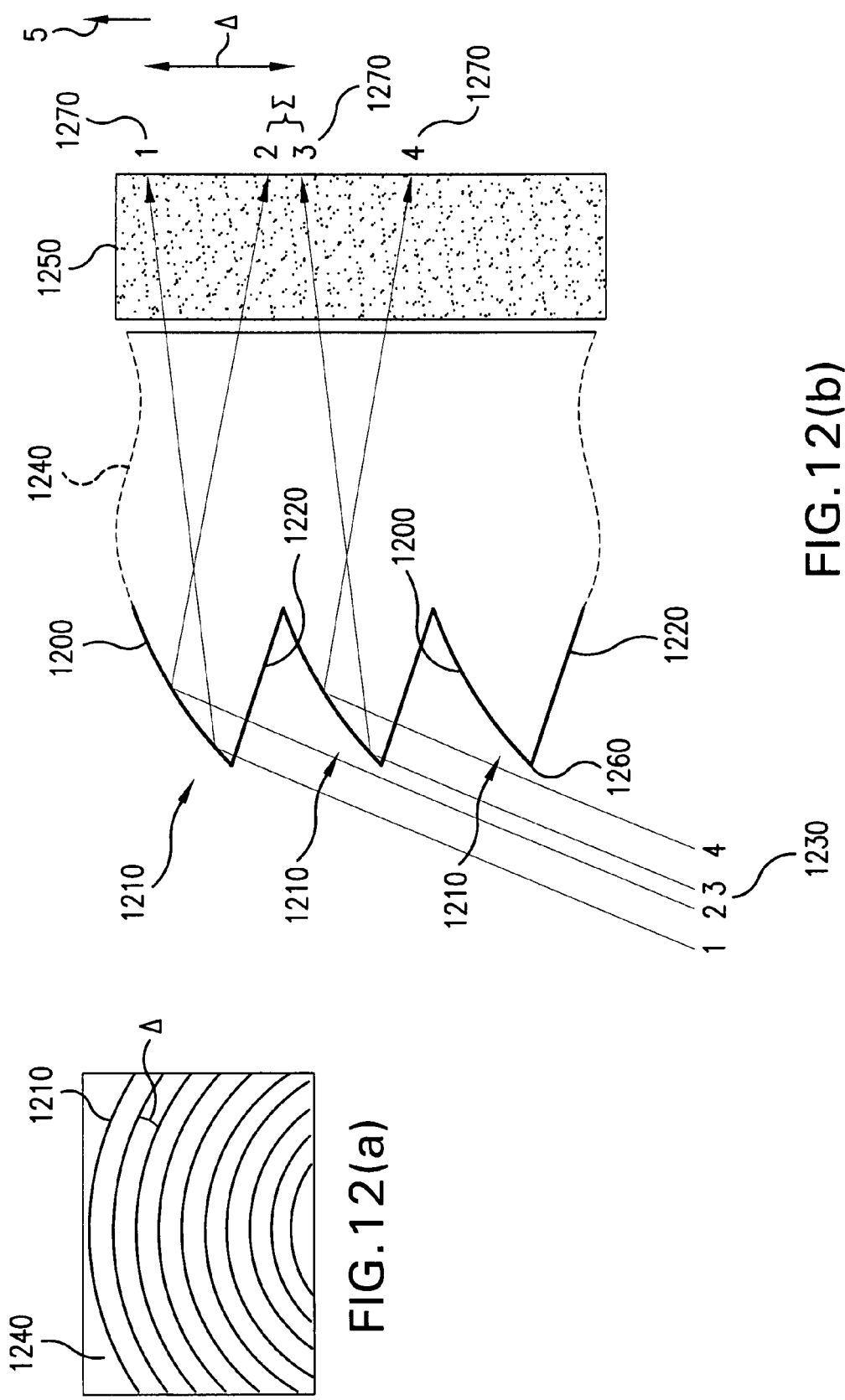

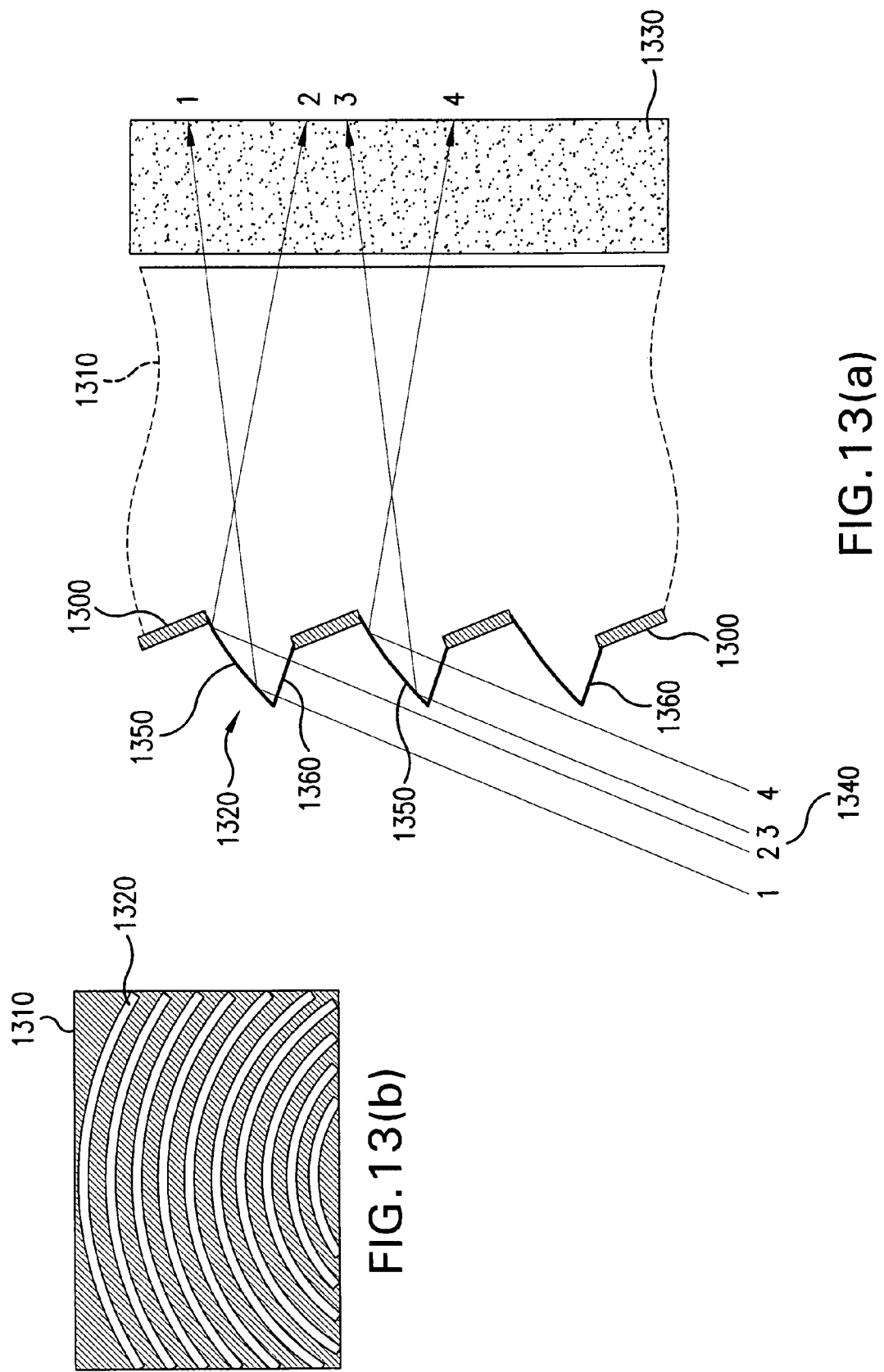

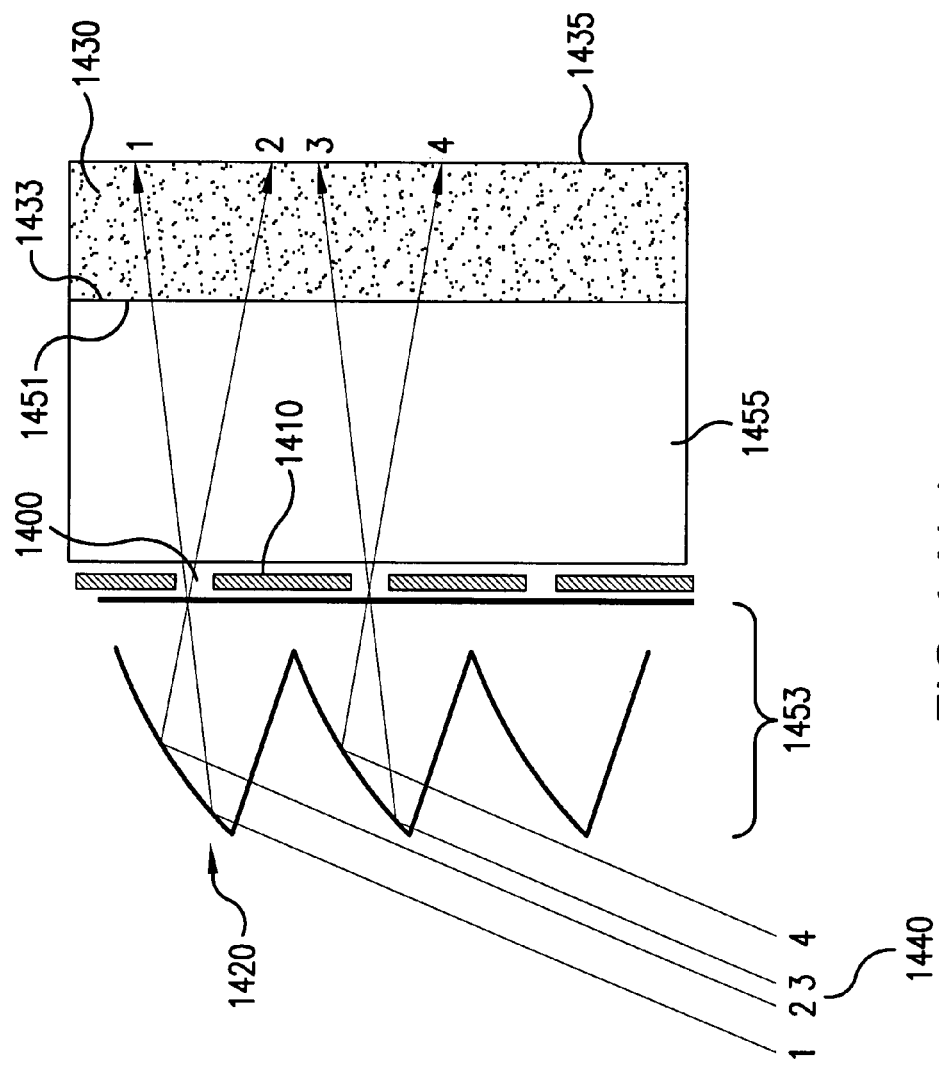
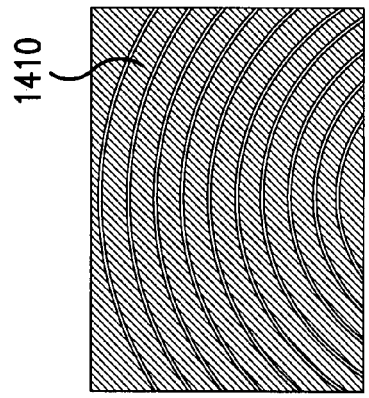
FIG. 14(a)
FIG. 14(b)

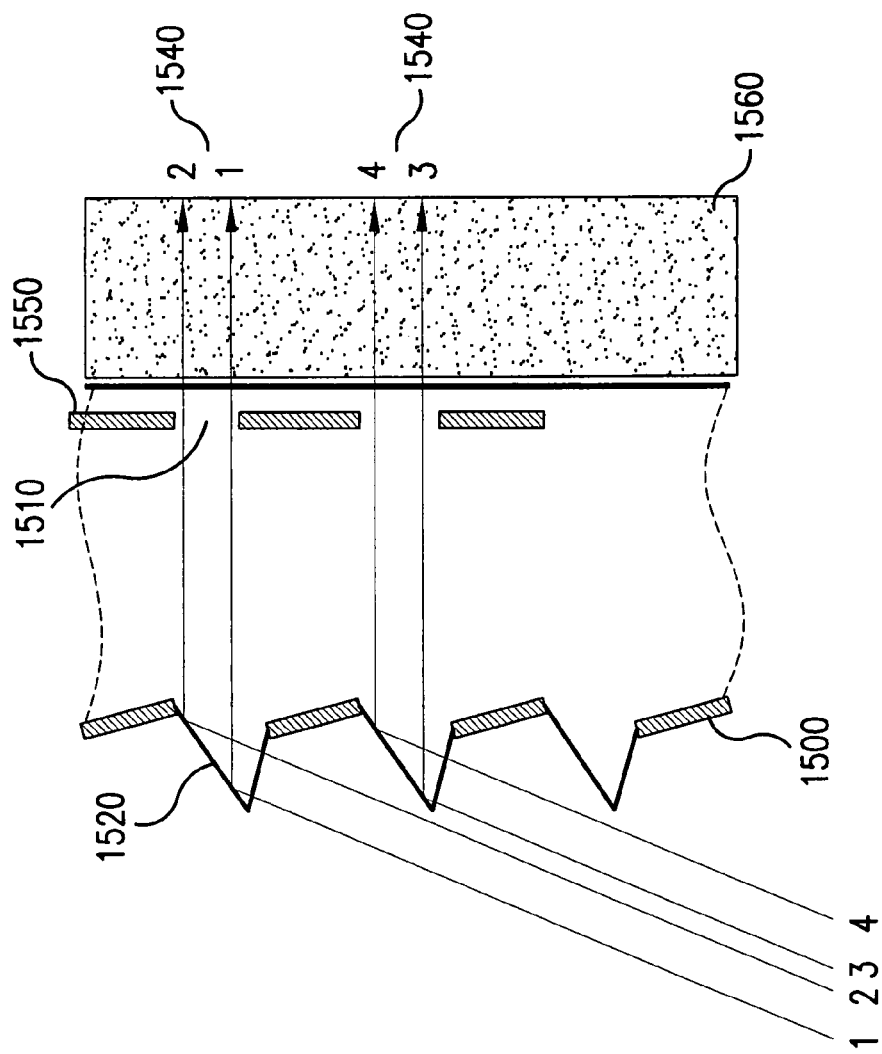
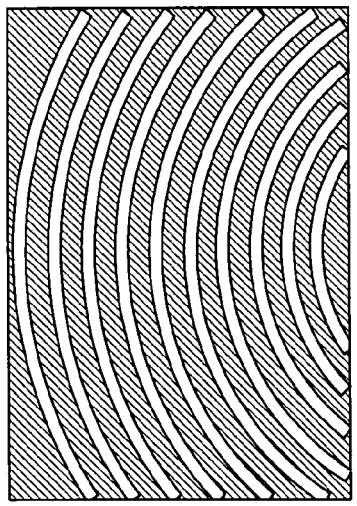
FIG.15(b)
FIG.15(a)

| Area | Incident light angle (deg.) | Distance from prism to axis L (mm) | FACET DEPTH (mm) | Prism top surface angle β (degree) | Prism bottom surface angle φ (degree) |
|---|---|---|---|---|---|
| 1 | 42 | 271 | -0.167 | 29.6 | -1.7 |
| 2 | 46 | 311 | -0.160 | 30.7 | -1.8 |
| 3 | 50 | 357 | -0.153 | 31.8 | -1.9 |
| 4 | 54 | 412 | -0.146 | 33.0 | -2.0 |
| 5 | 58 | 478 | -0.140 | 34.2 | -2.0 |
| 6 | 62 | 561 | -0.134 | 35.4 | -2.1 |
| 7 | 66 | 670 | -0.128 | 36.7 | -2.2 |
| 8 | 70 | 818 | -0.122 | 37.9 | -2.4 |
| 9 | 72 | 916 | -0.119 | 38.6 | -2.4 |

FIG.19(a)

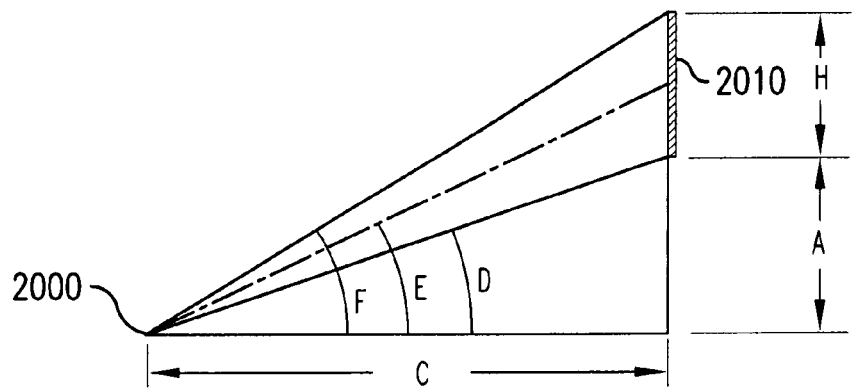
FIG.20(a)
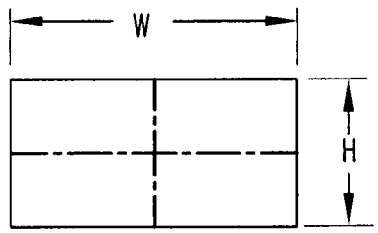
FIG.20(b)
| Screen diagonal (inch) | Screen diagonal (mm) | H (mm) | W (mm) | A | C | D | E | F |
|---|---|---|---|---|---|---|---|---|
| 60 | 1524 | 747 | 1328 | 260 | 297 | 41 | 65 | 74 |
H = Screen Height
W = Screen Width
A = Lens Axis to Screen Bottom
C = Convergence Point to Screen Plane
D = Lowest Ray Angle
E = Middle Ray Angle
F = Highest Ray Angle
FIG.20(c)

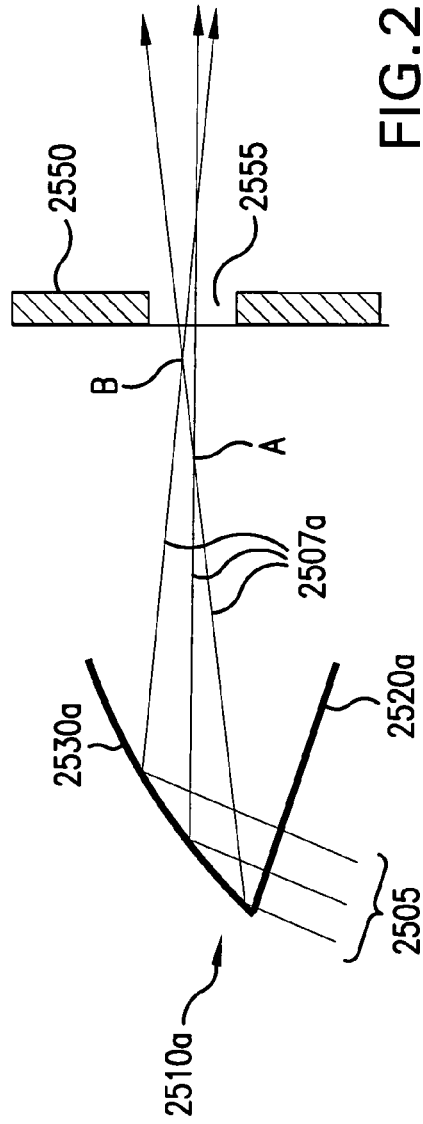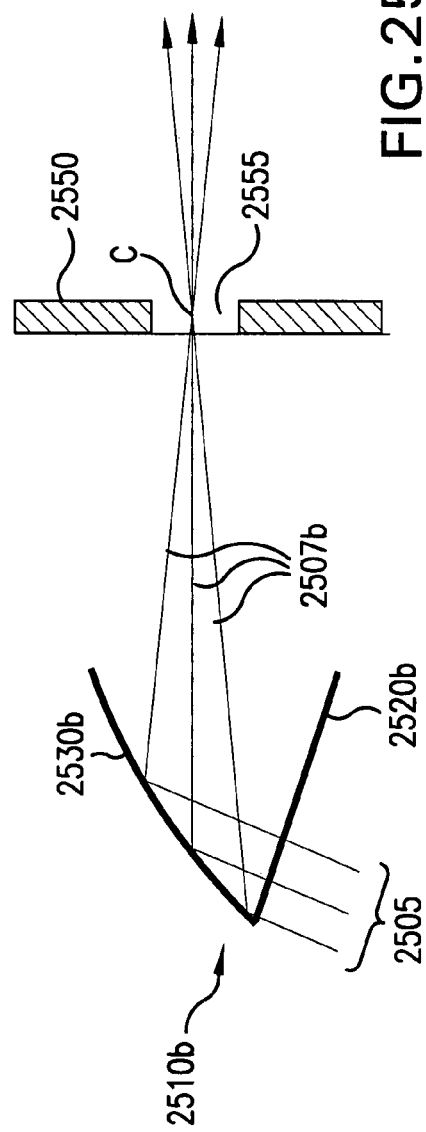

US 7,852,556 B2

TOTAL INTERNAL REFLECTION FRESNEL LENS SYSTEMS, ASSEMBLIES, AND METHODS

RELATED APPLICATION DATA

This is a continuation-in-part of application Ser. No. 11/171,070, filed Jun. 30, 2005 now U.S. Pat. No. 7,230,758, which claims priority from provisional application Ser. No. 60/585,621, filed Jul. 6, 2004, the entire contents of both of which are incorporated herein by reference.

FIELD OF THE INVENTION

The present invention is directed to off-axis, total internal reflection (TIR) Fresnel lens systems, assemblies, and methods and, in particular, to off-axis TIR Fresnel lenses that have a substantially flat output surface, as well as projection screens, and assemblies therewith, that include at least one diffuser and one lenticular lens and have a substantially flat input surface configured for air-gap-free connection to the TIR Fresnel lens.

BACKGROUND OF THE INVENTION

In general, projectors provide images by generating the image in a light source and projecting the same onto a screen. Referring to FIG. 1, a typical rear projection system or projection screen device includes a cabinet 110, a screen 140 installed on the front surface of the cabinet and where an image is formed, a light source 120, installed in the cabinet and generating and projecting an image, and reflection mirrors 100 and 130 reflecting the image input from the light source toward the screen. In the rear projection system having the above structure, an image projected in the rear of the screen and formed on the screen is viewed in front of the screen, that is, outside the cabinet.

Traditional rear projection televisions, as depicted in FIG. 1, generally are bulky, heavy, complicated to use, and expensive. A rear projection television or projection screen device having a flat panel display using projection technology, as shown in FIG. 2, is ultra-thin, lightweight, and has the potential to save costs by using fewer components.

Rear projection screens are made of either a lenticular lens or a diffuser or a combination of a lenticular lens and a diffuser that distributes or spreads the incident light in some angular distribution. Typically, a polymer diffuser may comprise a matrix and a plurality of dispersed light-scattering centers, with a controlled refractive index differential between the matrix and the light-scattering centers. FIG. 3 depicts a rear projection screen without a fresnel lens. Before the screen 310, incident light 320 has a certain incident angle. Beyond the screen, the strongest component of the distributed light 330 is in the incident direction. As such, a viewer sees a varying brightness on the screen, resulting in an uneven image where the light is brightest in the center of the screen and darkest in the corners of the screen. In projection with a refractive-type fresnel lens, depicted in FIG. 4, the fresnel lens 420 redirects the incoming light 410 such that its incident angle, as well as the strongest component of the distributed light 430, are both normal to the projection screen 440. This gives a more even brightness to the screen. Accordingly, even when a viewer moves to the edge of the screen, the level of brightness at different positions decreases more evenly.

FIGS. 5 and 6 illustrate a projection television employing a fresnel lens. Such projection televisions have great depth. FIGS. 7 and 8 show a newer traditional projection television with an off-axis fresnel lens. The depth of such a projection television is considerably thinner due to the off-axis fresnel lens, which permits the light source to be directed from below.

The general fresnel lens structure can be conceptualized as either a collection of grooves between facets, or a collection of facets between grooves. With reference to the cross-sectional view of a fresnel lens shown in FIG. 22, the fresnel lens facets can be described with two angles. The face angle 2220 (also called "facet angle") is defined as the angle between the surfaces adjacent grooves. The groove angle 2210 is the angle formed between the input face (i.e. the bottom side) of one facet and the reflection face (i.e., the top side) of the same facet. The geometry of a facet having a curved side, as in the present invention, is described below.

FIG. 21 shows a conceptual illustration of the sections of a larger fresnel lens. The sections can be used for rear projection screens. The fresnel lens has an axis 2130 at the center of a plurality of concentric rows of facets and grooves having predetermined facet and groove angles. In a rear projection display device in which incoming light enters perpendicularly to the face of the lens, or where the full lens field of the projection lens system is used, a center portion (indicated by the dashed rectangle) 2120 of fresnel lens 2100 is used as a fresnel lens for the display device. Rectangle 2110 provides an indication of a screen displaced from the center portion of fresnel lens 2100, as used in off-axis fresnel lenses where the incoming light enters at an angle. The size and shape of the portion of the lens to be used corresponds to the size and shape of the screen of the display device, i.e., the projection display. The term "off-axis" is used because the physical center of the fresnel lens 2110 is displaced from the axis 2130 of the larger fresnel lens 2100. In an off-axis lens, only the displaced portion is used. Any remaining portion of a larger fresnel lens from which the off-axis lens may have been derived is not used in the off-axis lens. Alternately, manufacturing techniques exist whereby only the off-axis portion of the fresnel lens is manufactured.

Although only the displaced portion of the lens is used in an off-axis fresnel lens, the off-axis lens is still considered to have an axis. The axis, however, may not appear on the actual lens. However, its position may be extrapolated from the elongated and arcuate concentric facets and grooves of the fresnel lens structure. For example, the off-axis fresnel lens 2110 has an axis 2130, even though the axis 2130 is at the lower edge of the lens. In other embodiments, the axis of an off-axis fresnel lens may even be substantially below or otherwise outside the lens border.

Though it may not be visible on the lens itself, the axis of an off-axis fresnel lens can be extrapolated by determining the radius of a circle defined by any one of the concentric rows of facets.

FIG. 20 shows a side view of a rear projection television with an off-axis fresnel lens. In FIG. 20(a), the light source 2000 is positioned below the screen 2010 having a height H and the incoming light rays strike the input surface of the screen at angles from the lowest ray angle D to the highest ray angle F, with a middle ray angle E. However, an off-axis lens may be used with any projection system where the light source is displaced from the center of the screen. FIG. 20(b) shows a front view of the projection screen with height H and width W. Specific dimensions of screen geometry and light incident angles for one embodiment are shown in FIG. 20(c).

FIG. 9 depicts the limited bending ability of a refractive-type prism, whereby the angle of bending $\delta$ is approximately half the prism angle $\theta$. Because the bending angle is limited to only half of the prism angle, the projection angle is limited, which limits the thinness of the projection system. Moreover, when θ is large, reflection loss 910 becomes large. The light angle as well as loss depends on wavelength, thereby resulting in a color shift on the display screen.

FIG. 10 illustrates the greater bending ability of a reflective-type prism, whereby light is more fully reflected at the interface of the prism and air because of "total internal reflection" ("TIR"). While this kind of internal reflection is termed "total," it should not be construed as absolute, as slight reflective loss may occur due to abnormalities or impurities in the prism material, interference of the light with air or other substances, or for other reasons which may be apparent to one skilled in the art. Nonetheless, TIR has a reflection efficiency nearing 100%. The bending angle δ could reach 90°, thereby making the projection system even thinner. A higher output brightness results because of less reflection loss. In addition, there is virtually no color shift because the bending angle and loss have no wavelength dependence.

FIG. 11 shows that a reflective fresnel lens has low resolution and scrambled images. That is, image resolution is limited by the distance Σ between facets, and the image on every pitch is scrambled. Accordingly, the sequence 1-2-3-4 in the input light rays 1100 becomes 2-1-4-3 in the output light rays 1110.

Another problem associated with fresnel lenses and projection screens is the reduced contrast due to ambient light. On the projection screen, dark colors are represented by an absence of light. Thus, any ambient light on the projection surface will decrease contrast by causing dark colors to appear lighter. This ambient light can originate from the input surface or output surface of the fresnel lens. In addition, depending on the configuration of the fresnel lens facets, light that is reflected within each TIR facet might not be optimally focused prior to reaching the projection screen.

As for the projection screen, most existing screens utilize some variation of a lenticular lens, wherein the exit surface of the projection screen is not flat (e.g., it is sinusoidal). Such non-flat viewing screens are quite prone to being damaged and difficult to handle, clean, and maintain. In addition, in existing systems, the input surface of the projection screen and/or the output surface of the fresnel lens are not flat. Therefore, when placed adjacent one another, or connected to one another, the fresnel lens-projection screen assembly inherently includes two additional surfaces (i.e., the output surface of the fresnel lens and the input surface of the screen) for reflecting ambient light, thereby causing loss of contrast on the viewing side of the projection screen.

Thus, there is a need for a reflective fresnel lens system that has high resolution, corrects the problem of image scrambling, has improved contrast, and optimizes the ability to focus reflected light rays within relatively small tolerances. Moreover, there is a need for a projection screen that can be easily and efficiently assembled with such a fresnel lens while, at the same time, optimizing contrast and maintainability.

SUMMARY OF THE INVENTION

Fresnel lenses collimate incoming light rays to ensure more uniform brightness of projected light on projection screens. Off-axis TIR fresnel lenses reduce thickness and weight, and improve ease of use of rear projection systems by redirecting and collimating incoming light from an angle without the need for bulky mirrors. However, off-axis TIR fresnel lenses have suffered from low resolution and low contrast. Resolution in fresnel lenses is limited to facet pitch size due to scrambling of incoming light rays. Contrast in fresnel lenses is lowered by ambient light entering through the input side and output side of the fresnel lens. The present invention addresses these and other limitations of off-axis fresnel lenses and projection screens through improved and novel off-axis fresnel lens and projection-screen structures.

In one embodiment, the present invention is directed to an off-axis fresnel lens comprising an input surface and an output surface. Outwardly-extending, total internal reflection-type prism facets are disposed on the input surface in concentric rows, each facet comprising a top side being outwardly convex, and a bottom side being substantially flat. In other embodiments, the top side may be substantially flat and the bottom side may be outwardly convex, or the top and bottom sides may both be flat. In a preferred embodiment, the top side may be spherical convex in shape. In a more preferred embodiment, the top surface has an aspherical convex surface.

The above embodiments may further comprise an opaque layer disposed on flat sections on the input side of the prism structures, adjacent to the sides of the facets, such that the opaque layer appears in the spaces between consecutive (concentric) rows of prism facets. The opaque layer may also be disposed between the prism facets and the output surface, having concentric generally transparent portions through which incoming rays reflected off the top side of each facet may pass without being blocked. In another embodiment, the opaque layer may be disposed on the output side of the fresnel lens, between the fresnel lens and the projection screen. In yet another embodiment, the opaque layer may be positioned horizontally, and yet concentrically with the rows of prism facets, thereby forming an opaque louver between the input and output surfaces of the fresnel lens. Combinations of these dispositions and positions of the opaque layer or other structures which selectively block the incoming light in a controlled fashion may also be used.

In another embodiment of the present invention, a projection screen in accordance with the present invention includes at least one diffuser and one lenticular lens, wherein the input and output sides of the diffuser and the input side of the lenticular lens are substantially flat, the diffuser's output side is coupled to the input side of the lenticular lens in such a way that there is substantially no air gap in the connection between the diffuser and the lenticular lens, and the output side of the lenticular lens includes a plurality of vertical lens arrays. In embodiments of the invention, the diffuser and the lenticular lens may be laminated, extruded, co-extruded, compression molded, stamped, casted, etc. together.

In an alternative embodiment, the above-described projection screen further includes a second lenticular lens that is coupled to the first lenticular lens, wherein the input side of the second lenticular lens includes a plurality of vertical lens arrays, and the output side of the first lenticular lens and the input side of the second lenticular lens have complementary shapes so as to be matingly connectable to one another. As before, the output side of the first lenticular lens and the input side of the second lenticular lens are coupled in such a way as to provide a substantially air-gap-free connection between the lenticular lenses. Additionally, the output side of the second lenticular lens is preferably substantially flat, so as to provide a flat screen on the viewer's side.

In yet another embodiment, a projection screen according to the present invention includes a lenticular lens having a plurality of vertical lens arrays on its input side, a diffuser having an input side that receives light transmitted from the lenticular lens' output side, and a clear layer of material having a first side for receiving light and an opposing second side that overlays the input side of the lenticular lens, wherein the lenticular lens' input side is coupled to the clear layer in such a way as to provide a substantially air-gap-free connection therebetween. The projection screen may also include a generally opaque layer that is disposed between the output side of the lenticular lens and the input side of the diffuser and includes transparent portions to allow passage of light from the lenticular lens to the diffuser. In a preferred embodiment, the lenticular lens is made of a material that has a larger refractive index than the refractive index of the clear layer, and the output side of the diffuser is substantially flat so as to provide a flat screen on the viewer's side.

In the above-mentioned embodiments, the projection screens are preferably configured to be coupled to the TIR fresnel lenses so as to form a projection assembly. Thus, in the various embodiments of the TIR fresnel lens and projection screens described herein, the fresnel lens may have a substantially flat output surface, and the projection screen may have a substantially flat input side, such that the fresnel lens may be connected to the projection screen with substantially no air gaps in between.

It is noted that, in this application, the terms "couple", "connect", "join", "attach", and variations and/or equivalents thereof are used by way of example, and not limitation, to indicate that various parts, sections, portions, layers, etc. are immediately next to, and in contact with, each other, without limitation as to the manner of achieving such a configuration. Thus, in embodiments of the invention, the various parts, sections, portions, layers, etc. may actually be separate structural pieces that are coupled, connected, joined, etc. to one another, or two or more of them may be extruded, molded, or otherwise made as an integral unit.

BRIEF DESCRIPTION OF THE DRAWINGS

FIGS. 10(a)-10(c) show the unlimited bending ability of a reflective-type prism.

FIGS. 12(a) and 12(b) show an off-axis fresnel lens in which the top side of the facets is curved.

FIGS. 13(a) and 13(b) show an off-axis fresnel lens in which the top side of the facets is curved and an opaque layer is disposed adjacent to the sides of the facets.

FIGS. 14(a) and 14(b) show an off-axis fresnel lens in which the top side of the facets is curved and an opaque layer is disposed between the facets and the output surface of the fresnel lens.

FIGS. 15(a) and 15(b) show an off-axis fresnel lens in which the top side and bottom side of the facets are flat, an opaque layer is disposed adjacent to the sides of the facets, and a second opaque layer is disposed between the facets and the output surface of the fresnel lens.

FIGS. 19(a)-19(c) show design details of a fresnel lens and facet according to an embodiment of the invention.

FIGS. 20(a)-20(c) show details of a rear projection television and projection screen.

FIGS. 25(a) and 25(b) show light being focused using, respectively, a spherical convex surface and an aspherical convex surface.

DETAILED DESCRIPTION

Figure 2:
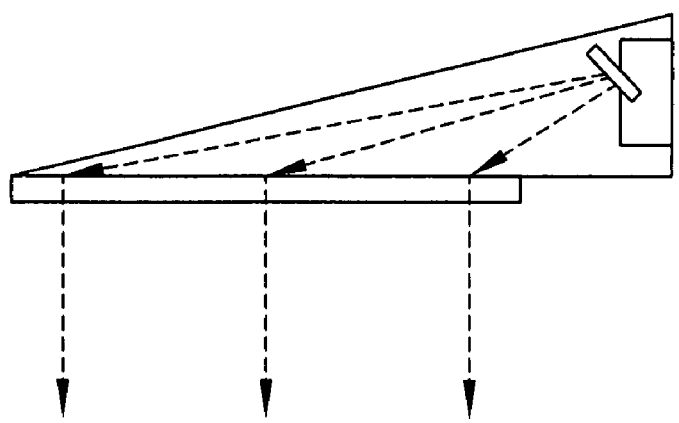
FIG. 2 shows an ultra-thin, light, and easy to use rear projection screen.
Figure 1:
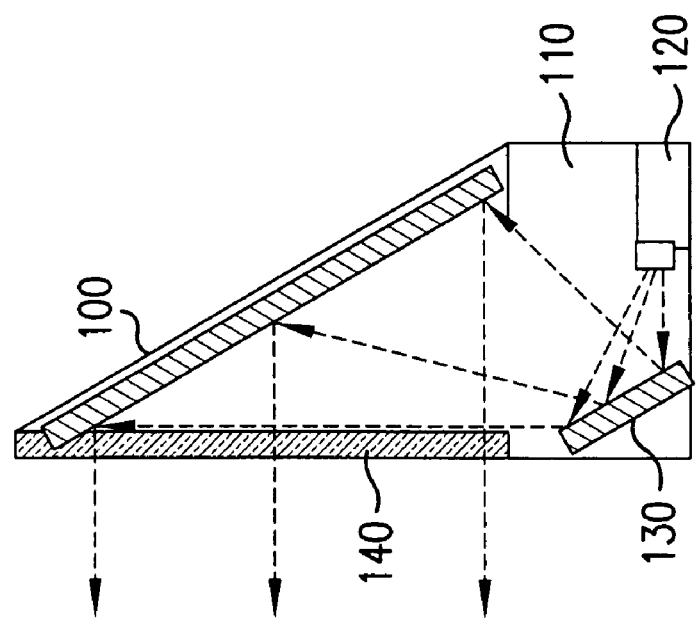
FIG. 1 shows a typical rear projection system including a light source, mirrors, and screen.
Figure 3:
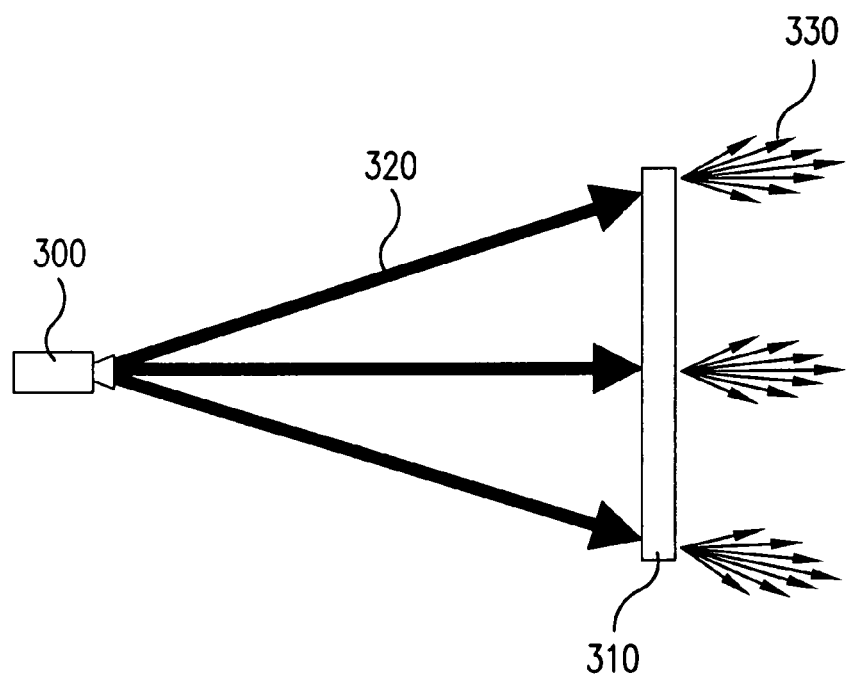
FIG. 3 shows a rear projection screen without a fresnel lens.
Figure 4:
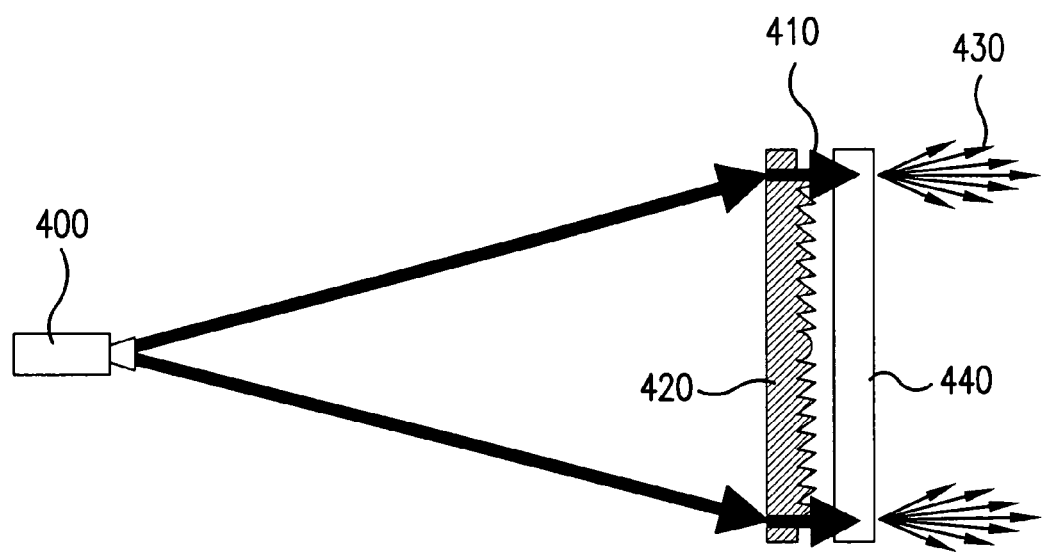
FIG. 4 shows a rear projection screen with a fresnel lens.
Figure 5:
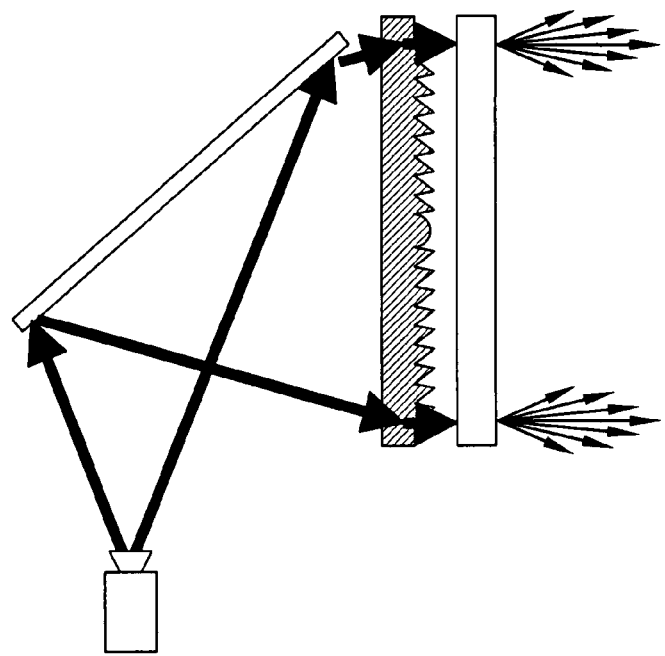
FIG. 5 shows a projection television employing mirrors and a fresnel lens.
Figure 6:
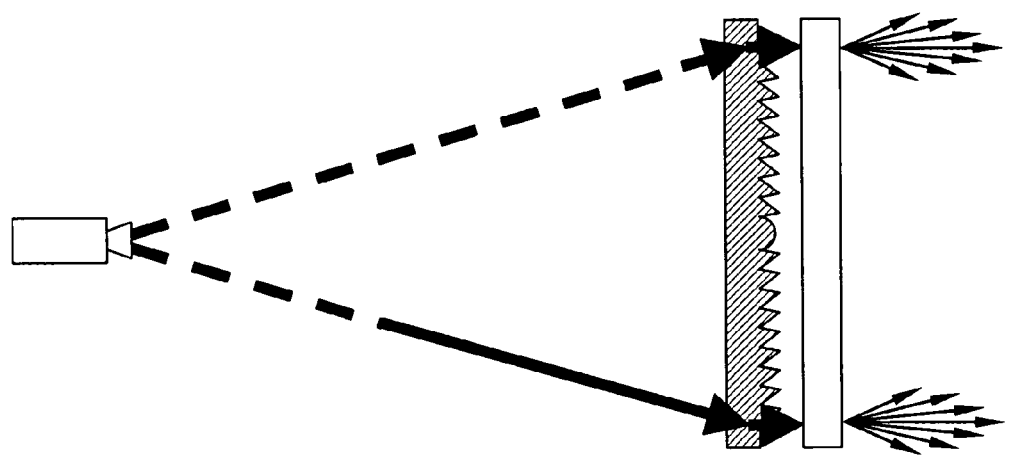
FIG. 6 shows the equivalent light path of a projection television employing mirrors and a fresnel lens.
Figure 7:
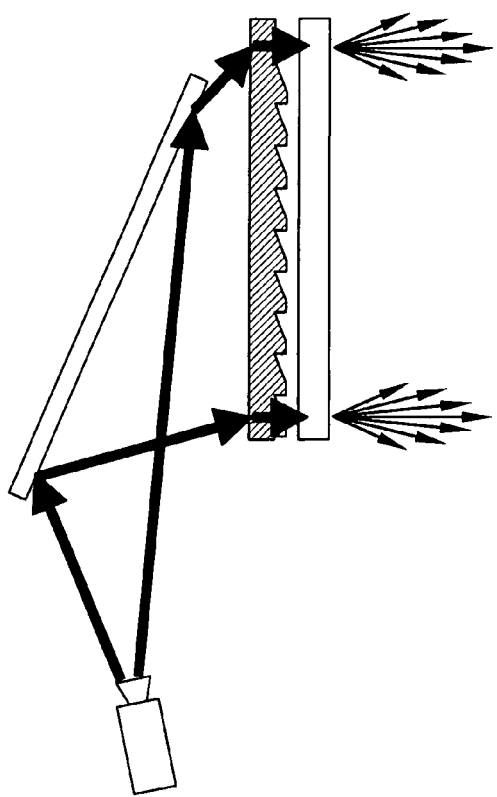
FIG. 7 shows a newer traditional projection television with an off-axis fresnel lens.
Figure 8:
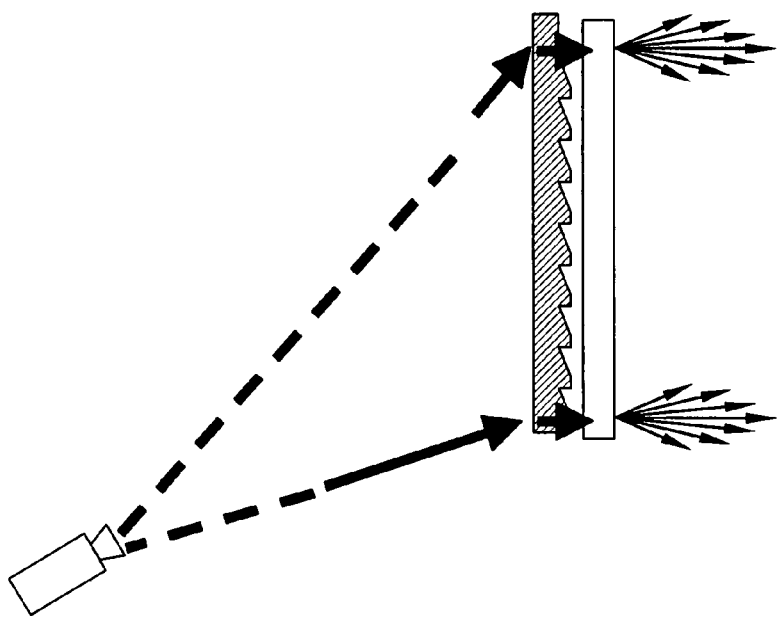
FIG. 8 shows the equivalent light path of a newer traditional projection television with an off-axis fresnel lens.
Figure 9C:
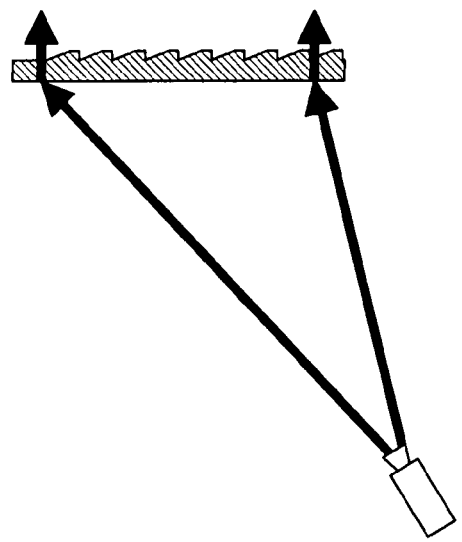
FIGS. 9(a)-(c) show the limited bending ability of a refractive-type prism.
Figure 9B:
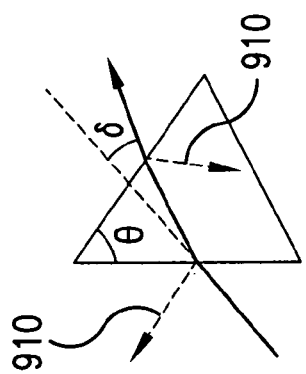
Figure 9A:
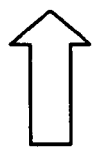
Figure 11:
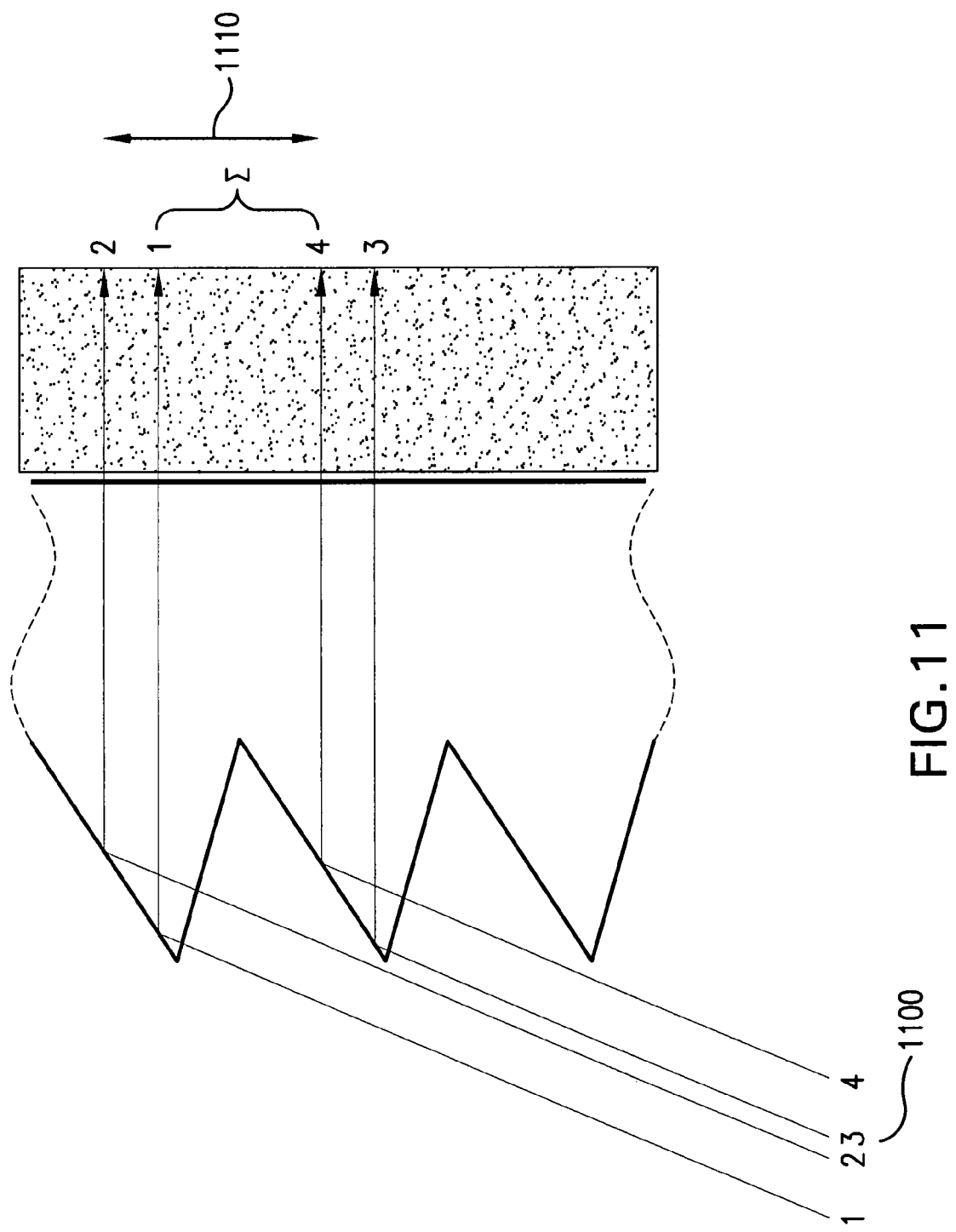
FIG. 11 shows that a reflective-type fresnel lens has low resolution and scrambled images.

One embodiment, as illustrated in FIGS. 12(a) and 12(b), produces a higher resolution than that produced by the traditional TIR fresnel lens design with flat prisms. The images before and after the fresnel lens have the same order. Such a design provides a resolution surpassing the limit of the fresnel lens pitch length.

FIG. 12(a) shows a view of the input surface of the fresnel lens 1240. A number of off-axis TIR prism facets 1210 having facet pitch Δ are arranged in a concentric fashion (i.e., concentric rows) on the input surface of the fresnel lens 1240. In one embodiment, the facet pitch is 0.1 mm, but the facet pitch may be anywhere in the range of 0.005 mm to 1.0 mm.

FIG. 12(b) shows a cross-sectional side view of the fresnel lens 1240, projection screen 1250, and facets 1210. The facets 1210 have a top side 1200 and a bottom side 1220. Input light 1230 enters through the bottom side, reflects off the lower surface of the top side 1200, exits the fresnel lens 1240, and passes to the projection screen 1250. The top side 1200 is curved such that it causes the order of input light rays 1230 to be the same as the order of exit light rays 1270. This curvature is outwardly convex, with respect to the outside surface of the prism, and inwardly concave, with respect to the inside of the prism where the light rays strike. The curvature of the top side 1200 causes the input light rays which strike the top side 1200 of the facet at a point closest to the facet peak 1260 to appear on the projection screen 1250 at a direction 5 above input light rays striking the top side 1200 of the facet at points farther from the facet peak 1260. As a result, the order of the input light rays 1230 is preserved on the projection screen 1250, thereby preventing scrambling of the image at each pitch.

Another embodiment is shown in FIGS. 13(*a*) and 13(*b*). FIG. 13(*a*) shows an opaque layer 1300 applied to the unused parts of the input surface between each facet 1320 of the fresnel lens 1310. During manufacturing, the opaque layer may be applied to the fresnel lens by printing, scribing, embossing, laser marking, photopolymerization, photomasking techniques, or other suitable means or techniques which may be apparent to one skilled in the art. Portions of the input surface between adjacent facets (i.e., facets of two adjacent rows) are unused because the facets prevent input light rays 1340 from entering the facets 1320 from below, thereby leaving an area between the top side 1350 of one facet and the bottom side 1360 of an adjacent facet. The opaque layer causes the blockage of this ambient light entering through the input surface of the fresnel lens 1310. The reduction of ambient light entering through the input surface of the fresnel lens will thereby increase the display contrast on the projection screen 1330. Moreover, in the present invention, the fresnel lens can be laminated to a diffuser screen, reducing the loss of reflection between the traditional fresnel lens and projection screen. FIG. 13(*b*) shows the input surface of the off-axis fresnel lens 1310 with the opaque layer applied between the facets 1320.

In yet another embodiment of the invention shown in FIGS. 14(*a*) and 14(*b*), the opaque layer provides even more contrast by blocking a majority of the ambient light. FIG. 14(*a*) shows a projection screen 1430 coupled to a fresnel lens having facets 1420 on its input surface. More specifically, the projection screen 1430 has an input side 1433 that is connected to the output surface 1451 of the fresnel lens. The output side 1435 of the projection screen constitutes the viewer's side of the screen 1430.

As shown in FIG. 14(*a*), a generally opaque layer 1410 is disposed at a location between the facets 1420 and the output surface 1451 of the fresnel lens. The generally opaque layer 1410 includes concentric transparent portions 1400 that allow passage of light. Thus, in practice, input light rays 1440 are focused on the generally transparent portions 1400 in the interior of the fresnel lens between the facets 1420 and the projection screen 1430. As shown in FIG. 14(*b*), the opaque layer 1410 blocks a large amount of ambient light because the area covered by the generally transparent portions 1400 is small compared to the total input surface area, leaving very little available surface area through which ambient light is able to pass.

It is noted that, in some embodiments, the fresnel lens may be a unitary structure that is then coupled to the projection screen. Thus, in FIGS. 12(*a*) and 13(*a*), for example, the fresnel lenses 1240 and 1310 are unitary structures that may be connected to projection screens 1250 and 1330, respectively. In other embodiments, however, the fresnel lens may comprise various lens portions that are themselves coupled to each other.

For example, in FIG. 14(*a*), the fresnel lens has a first lens portion 1453 and a second lens portion 1455. As shown, the first lens portion 1453 includes the facets 1420, and the second lens portion 1455 includes, i.e., ends with, output surface 1451 of the fresnel lens. In such an embodiment, the generally opaque layer 1410 is sandwiched between the first lens portion 1453 and the second lens portion 1455 in a manner that substantially eliminates any air gaps in the connection between the opaque layer 1410 and the lens portions 1453, 1455.

An additional embodiment, shown in FIGS. 15(*a*) and 15(*b*), produces good contrast but lower resolution. Opaque layers are applied to both the unused parts 1500 between each facet, as well as the space 1550 between the generally transparent portions 1510 through which light reflected off the upper side 1520 of each facet passes. However, because the upper side 1520 of each facet is straight rather than curved, the order of incoming light rays 1530 is scrambled as output light rays 1540 on the projection screen 1560, resulting in lower resolution.

Figures 16A, 16B:
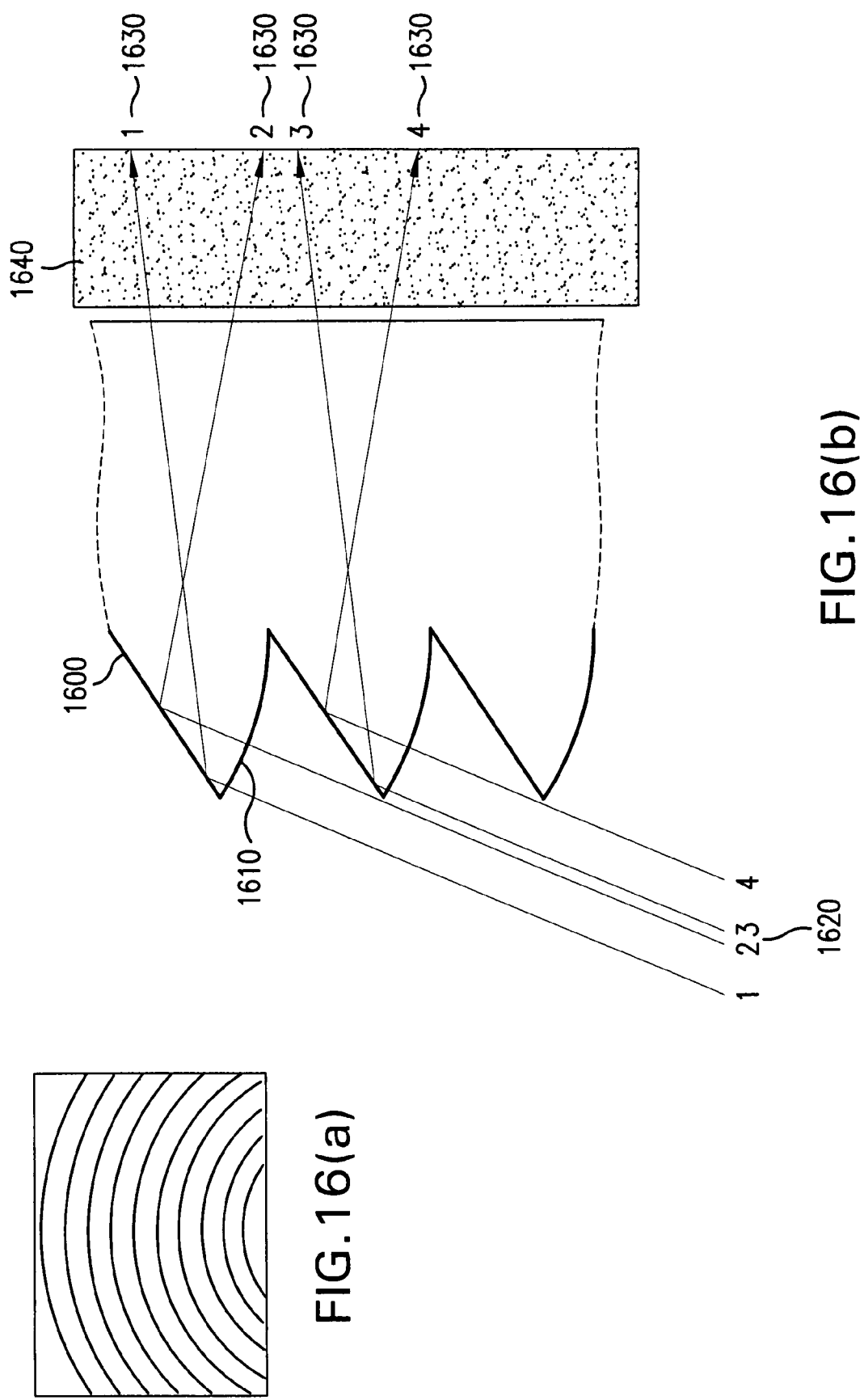
FIG. 16 shows an off-axis fresnel lens in which the bottom side of the facets is curved.

Another embodiment of the invention, as illustrated in FIGS. 16(*a*) and 16(*b*), produces a higher resolution than that produced by the prior art. This embodiment has a different shape from, but provides the same focus function as, the embodiment shown in FIG. 12(*b*) due to the curvature of the lower side 1610 of each facet. This curvature is outwardly convex, with respect to the outside surface of the prism where the light rays strike, and inwardly concave, with respect to the inside of the prism. Incoming light rays 1620 are bent as they pass through the lower side 1610 of each facet such that the order of incoming light rays 1620 is preserved as output light rays 1630 on the projection screen 1640, resulting in higher resolution. In other embodiments (not depicted), both the top side and bottom side of the facets may be substantially curved. The foregoing designs can provide a resolution surpassing the limit of the fresnel lens pitch length.

Figure 17:
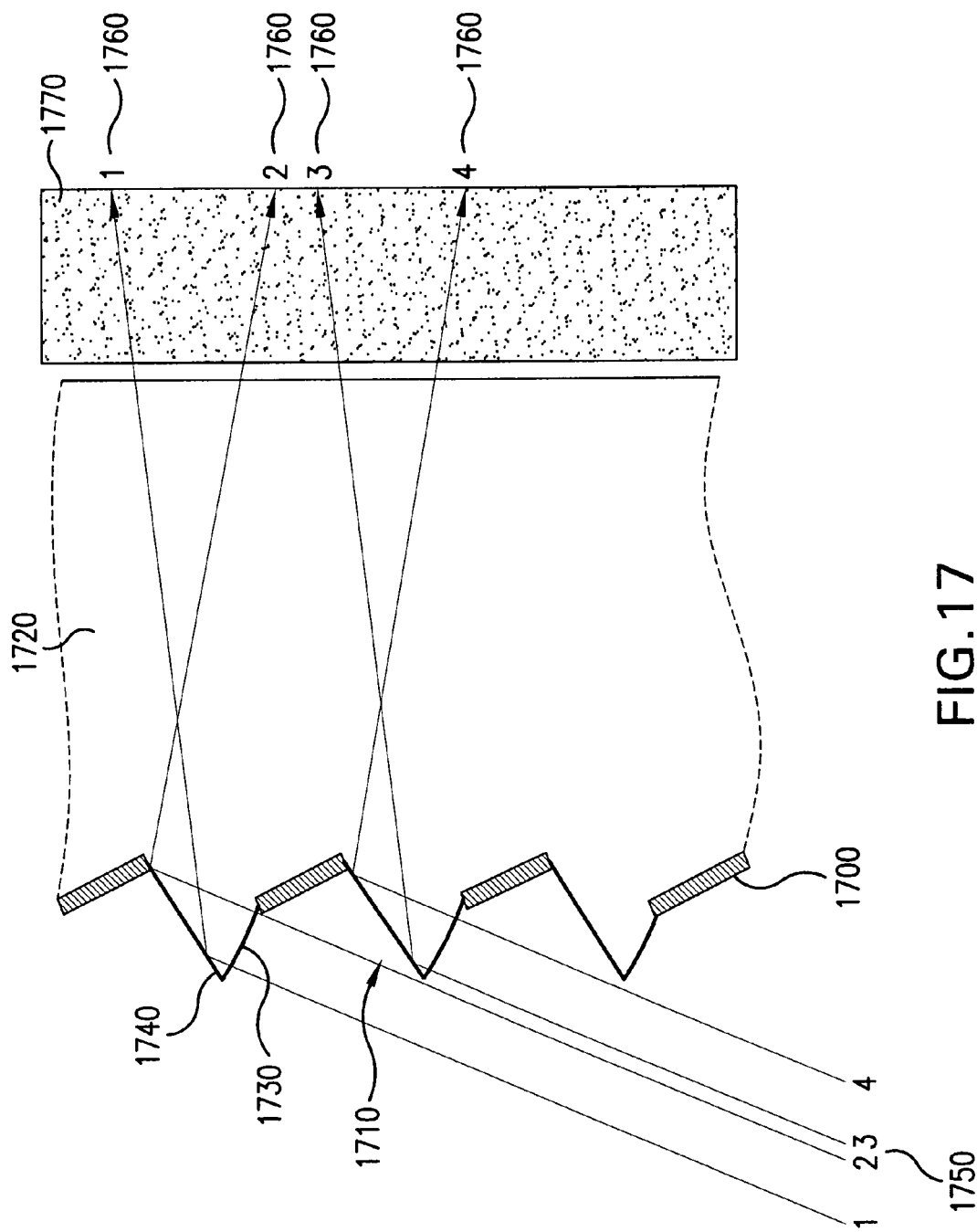
FIG. 17 shows an off-axis fresnel lens in which the bottom side of the facets is curved and an opaque layer is disposed adjacent to the sides of the facets.

Another embodiment of the invention, as illustrated in FIG. 17, includes an opaque layer 1700 applied to the unused parts between each facet 1710 of the fresnel lens 1720. The opaque layer 1700 causes the blockage of ambient light, thereby increasing the display contrast. As in the embodiment of FIG. 16(*b*), incoming light rays 1750 are bent as they pass through the curved lower side 1730 of each facet 1710 such that the order of incoming light rays 1750 is preserved as output light rays 1760 on the projection screen 1770, resulting in higher resolution.

Figure 18:
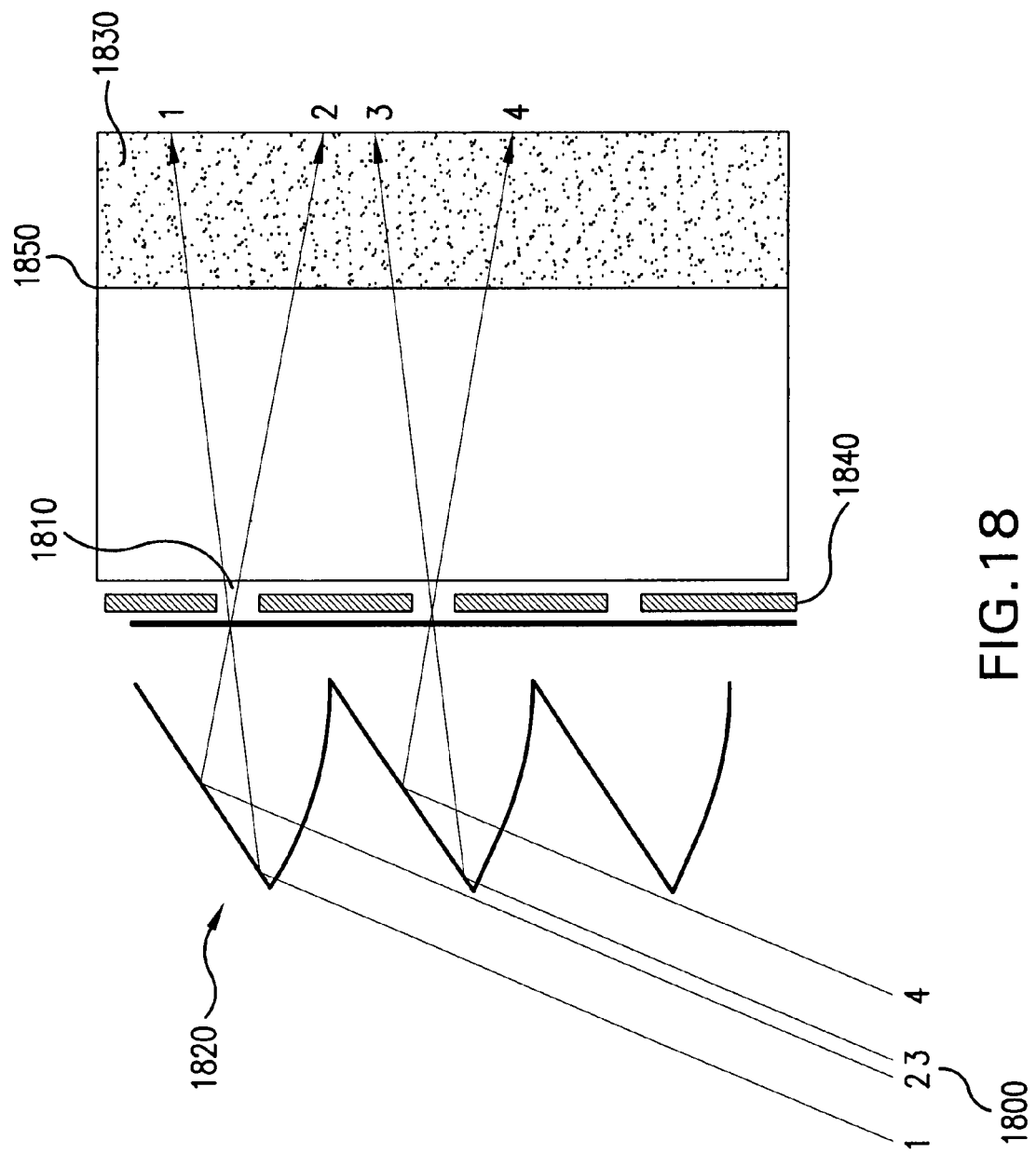
FIG. 18 shows an off-axis fresnel lens in which the bottom side of the facets is curved and an opaque layer is disposed between the facets and the output surface of the fresnel lens.

In another embodiment of the invention, as depicted in FIG. 18, the opaque layer provides even more contrast. Here, input light rays 1800 are focused on generally transparent portions 1810 in the interior of the fresnel lens between the facets 1820 and the output surface 1850. The opaque layer 1840 includes concentric generally transparent portions 1810 that allow passage of the reflected input light rays 1800. In this embodiment, most ambient light is blocked, greatly increasing the contrast of the projection display 1830.

Figure 23:
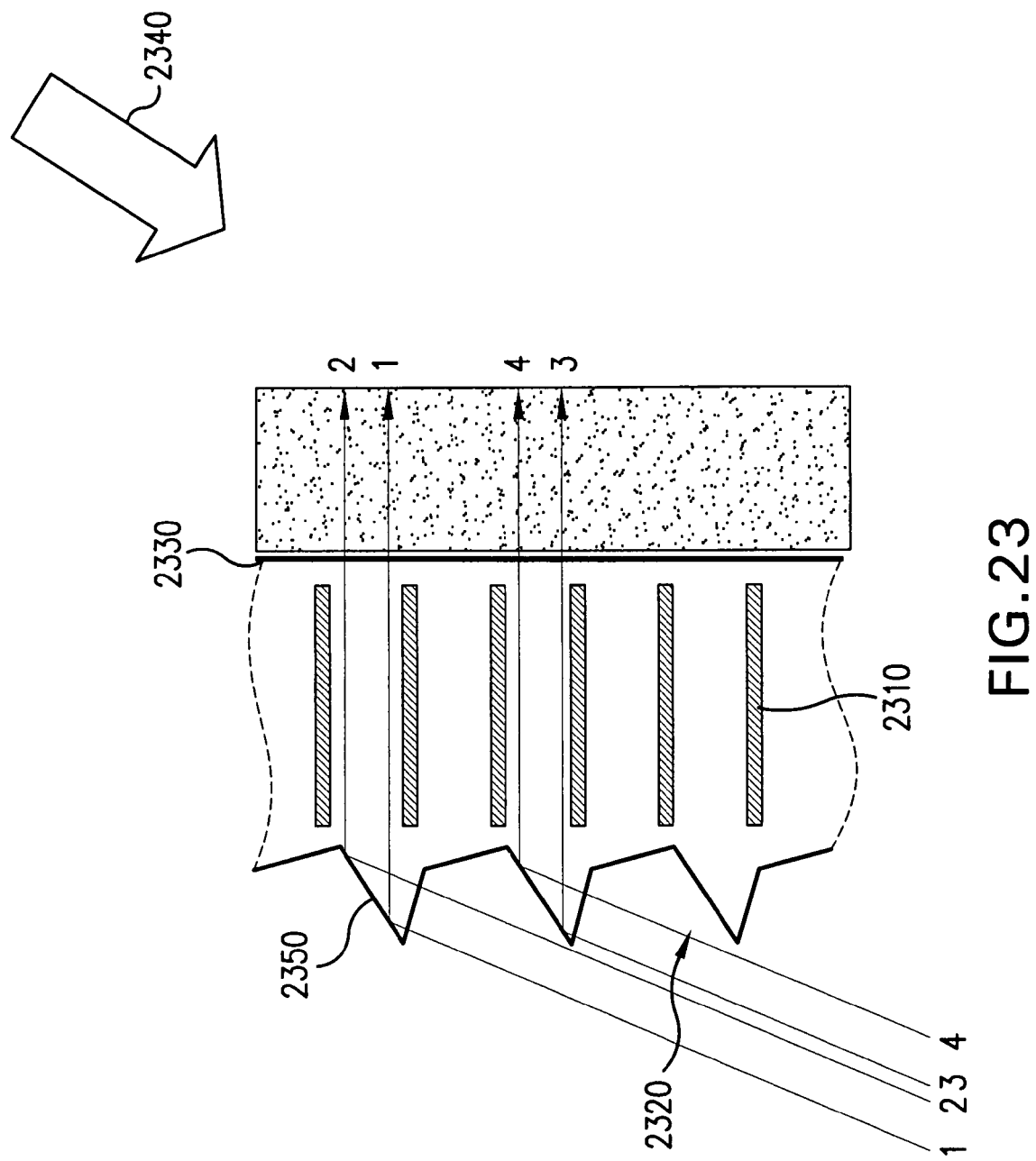
FIG. 23 shows an off-axis fresnel lens in which a generally opaque and horizontal louver is defined between the facets and the output surface of the fresnel lens.

In yet another embodiment of the invention, as depicted in FIG. 23, a concentric, generally opaque louver 2310 having a horizontal cross-section is defined between the prisms 2320 and the output surface 2330. This opaque louver is effective to block ambient light 2340 that is not incident normally on the screen.

Thinness, high resolution, and increased contrast are achieved in these embodiments through the combination of the fresnel lens with facets having a curved surface, and the opaque layers. Moreover, in all these embodiments, the overall projection system will be even thinner by adding one or more mirrors in the projector side.

Figure 19B:
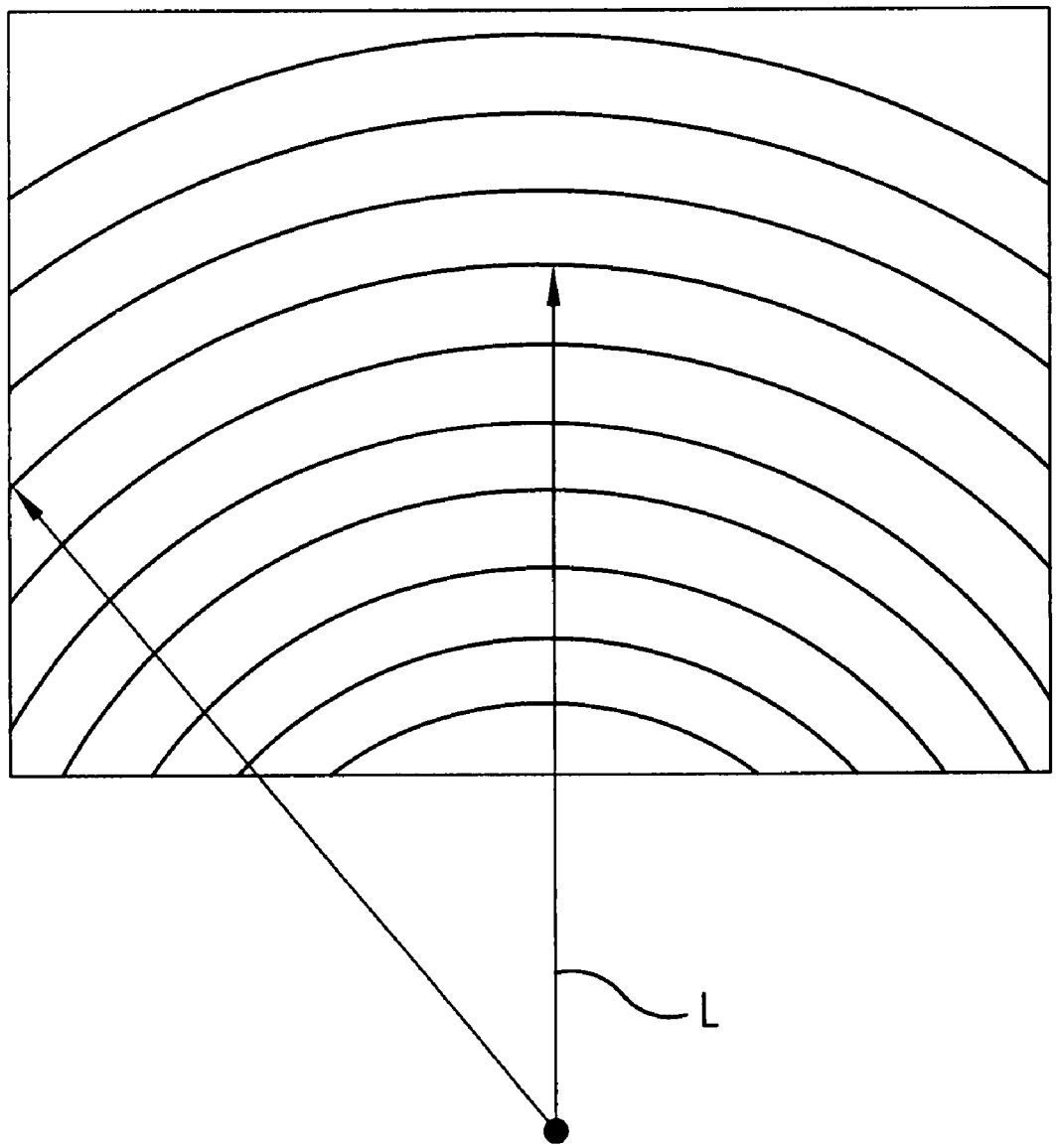
Figure 19C:
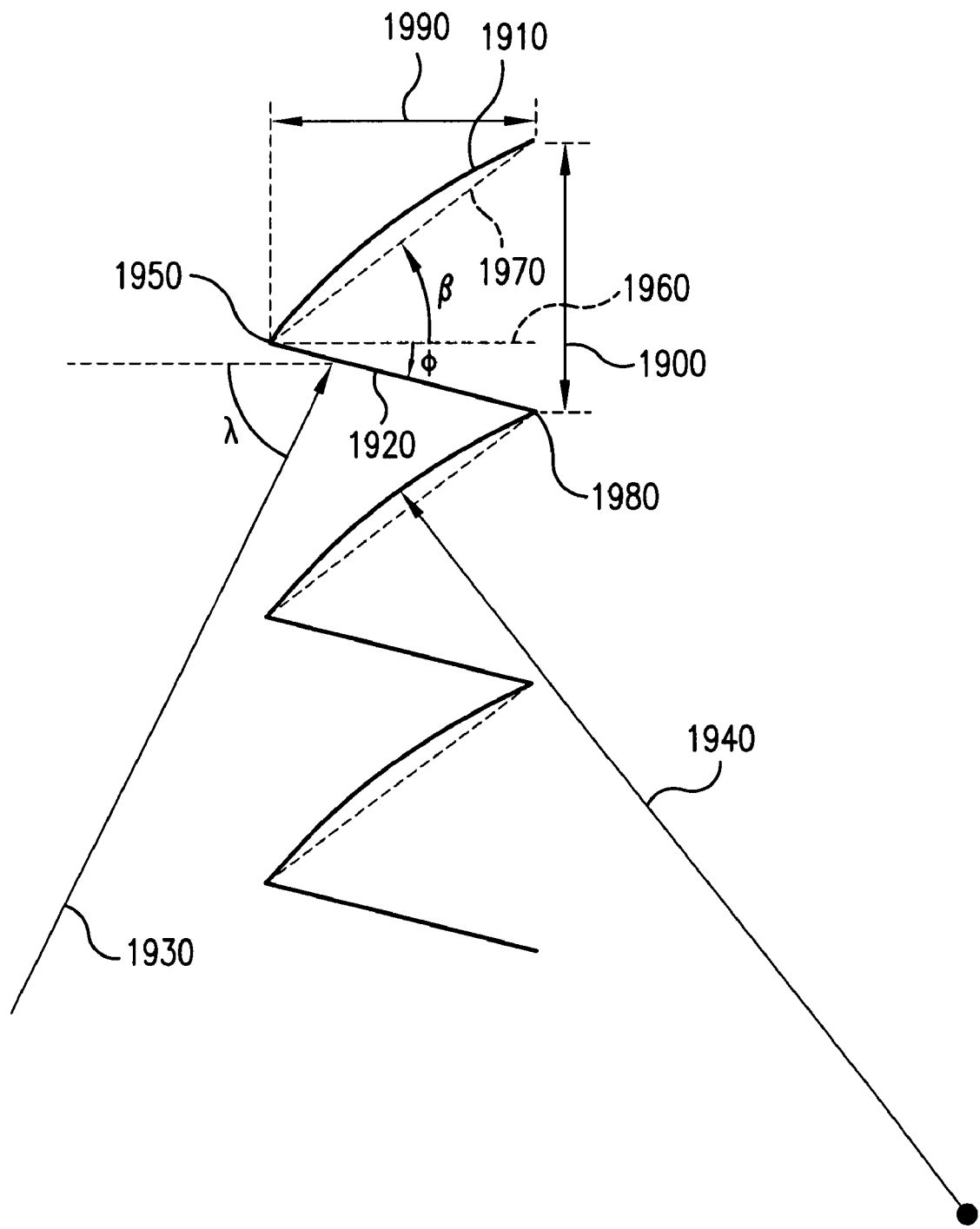
Figure 21:
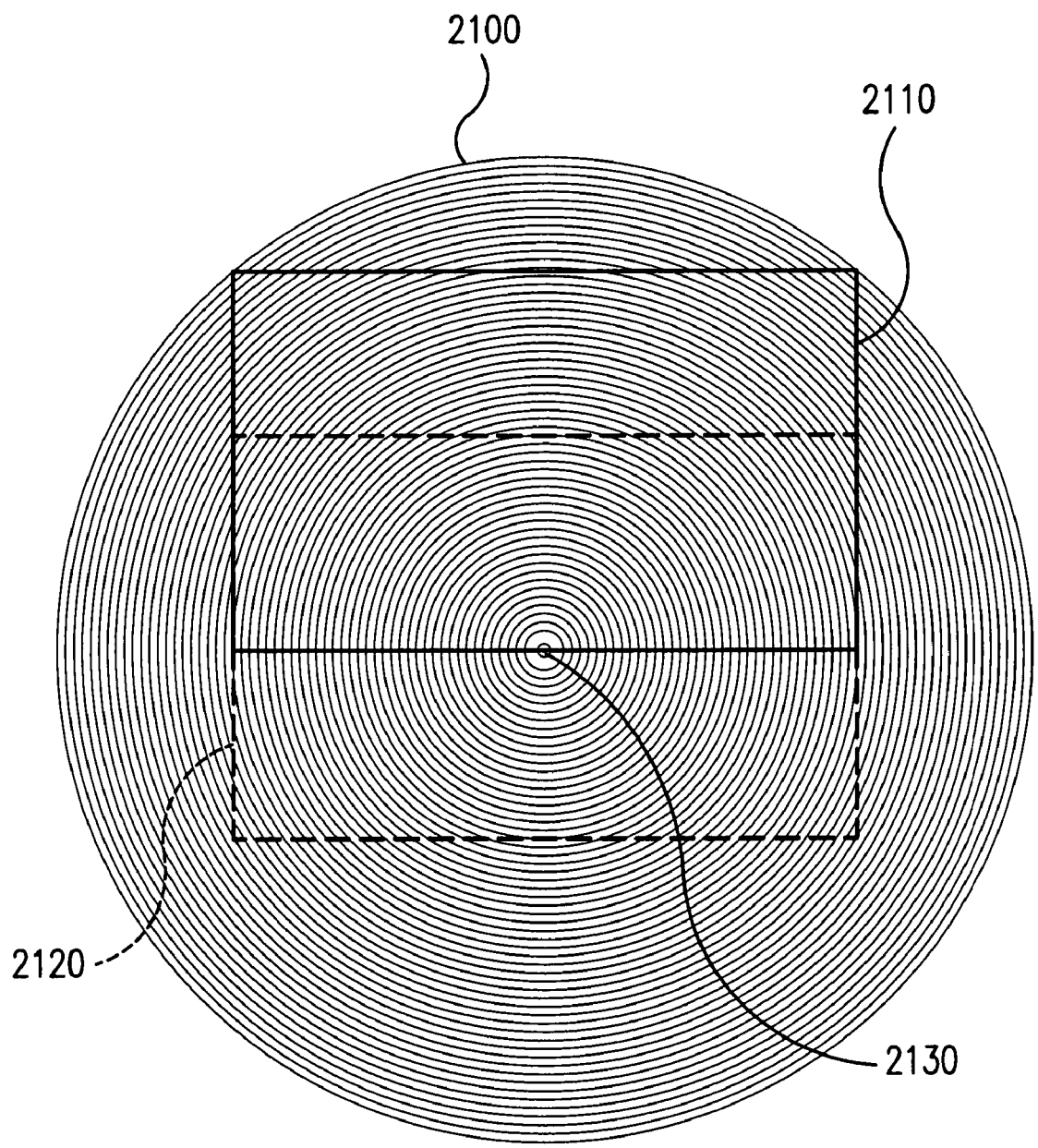
FIG. 21 shows a conceptual illustration of the sections of a larger fresnel lens.
Figure 22:
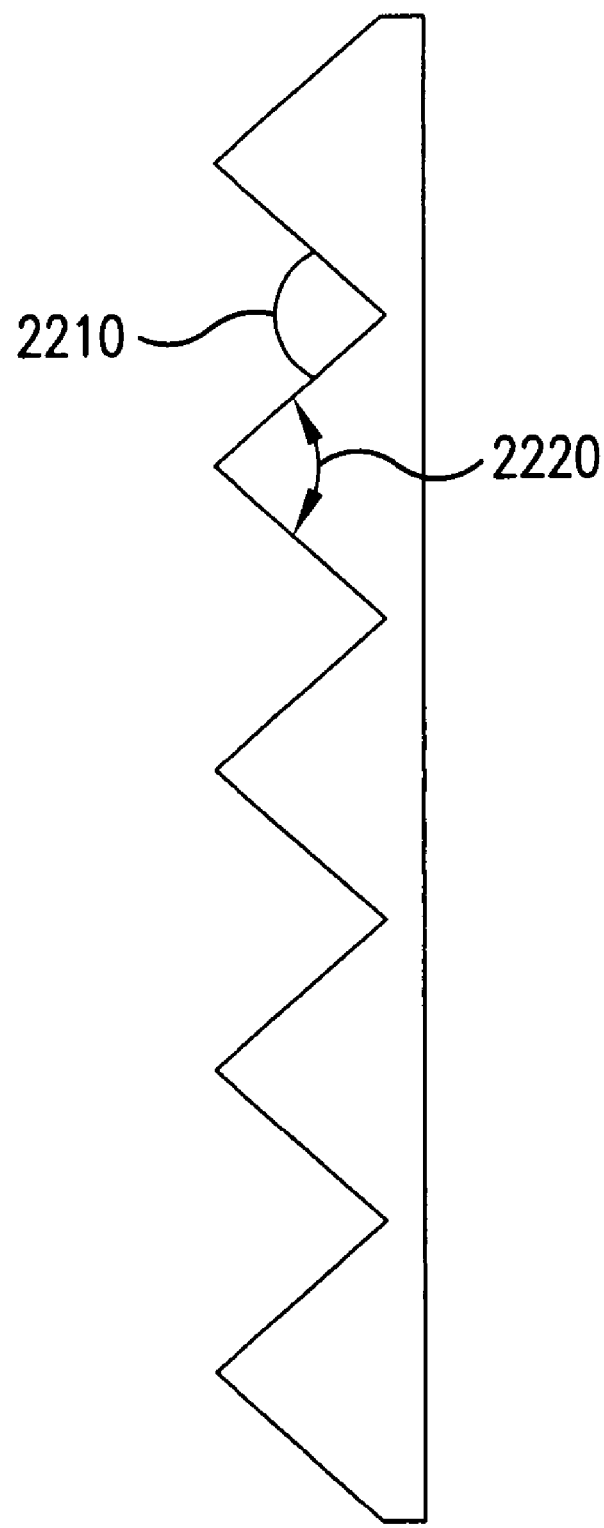
FIG. 22 shows the angles on an embodiment of a fresnel lens facet.

All of the embodiments described above include a fresnel lens containing prism facets. FIGS. 19(a)-19(c) show details of a facet design. FIG. 19(c) shows an exploded view of facets having a curved top side, as in one embodiment of the present invention. Facet pitch 1900 is the farthest distance between the top side 1910 and the bottom side 1920 of a facet. In one embodiment, facet pitch is 0.1 mm, and the thickness of the fresnel lens, which is the distance from the prism peak 1950 to the flat output surface of the fresnel lens, is about 1 mm. In embodiments of the invention, however, the thickness of the fresnel lens may be as small as about 0.5 mm, and as large as about 5.0 mm.

Facet pitch is generally the same for all facets in a given embodiment. For example, if facet pitch is given as 0.1 mm, then all facets in the fresnel lens of that embodiment will be about 0.1 mm. The prism peak 1950 is the point of a facet, farthest from the base 1980, where the top side 1910 and bottom side 1920 converge. Facet depth 1990, in turn, is the distance from the prism peak 1950 to the prism base 1980.

In the embodiment shown in FIG. 19(c), the top side 1910 of the facets is curved in the shape of an arc of a circle (i.e., a spherical convex shape) having a radius 1940 of about 2.0 mm. Incoming light rays 1930 have an incident light angle of $\lambda$. For the purposes of describing and measuring the facet dimensions, an imaginary facet bisector 1960 may be drawn from the tip of the facet (i.e., the prism peak) to the base 1980. Where one surface of the facet is longer than the other, as depicted in FIG. 19(c), the facet bisector divides the facet into two portions of unequal size. The facet bisector 1960 bisects the longitudinal extent of the facets, and is normal to the screen (not depicted). The prism bottom side angle $\phi$ is the angle between the bottom side 1920 and the facet bisector 1960. The prism top side angle $\beta$ is defined with reference to an imaginary arc connector 1970 which connects the endpoints of the curved top side 1910 in the embodiment shown.

Although the facets shown in the embodiment of FIG. 19(c) have a circular top side, in alternative embodiments of the invention, the top side may be substantially flat and the bottom side may be curved. In other embodiments, both the top and bottom sides of the facet may be substantially flat. In still other embodiments, both the top side and the bottom side of the facets may be substantially curved. In such embodiment, the top and bottom side angles are computed accordingly. Thus, for example, where the top side is substantially flat and the bottom side is curved, the top and bottom side angles will be computed as described above, except that the curvature of the top and bottom sides is reversed. Thus, the bottom side contains the arc connector and the bottom side angle is the angle from the facet bisector to the arc connector.

The exact dimensions of the facets in the various embodiments may be determined by optical design and analysis software products that will be known to those skilled in the art. For example, ZEMAX Development Corporation develops optical design software that provides for modeling of fresnel lenses. For further design and manufacturing, optical design and analysis software can interface with computer aided design (CAD) software;

FIG. 19(a) shows sample dimensions of one embodiment of the present invention derived from optical design and analysis software. There will be numerous facets in a given fresnel lens. For example, if facet pitch is 0.1 mm and the height of the fresnel lens is 747 mm, there will be roughly 7,470 facets per screen. However, for simplicity, only nine areas are depicted in FIG. 19(a). These nine areas correspond to concentric rows of facets of the fresnel lens at nine different distances from the lens axis. Incident light angle, facet depth, prism top side angle, and prism bottom side angle all vary with the distance from the facet to the axis. FIG. 19(b) shows ten different concentric rows of facets, each row being at a distance L from the imaginary lens axis, which is below the off-axis fresnel lens. FIG. 19(b) is not to scale with the nine areas of FIG. 19(a), which are not at equally spaced distances from the lens axis.

As noted previously, in the embodiments described above, where the top side of the facets is curved, such curvature may generally correspond to an arc of a circle. Thus, in a 3-dimensional sense, the top side of each prism facet of the fresnel lens may be said to have a spherical shape, e.g., a spherical convex shape, where a cross-section of the sphere can be described in Cartesian coordinates by $R^2=(X-a)^2+(Y-b)^2$, where R is the radius of the sphere (or circular cross-section thereof), and (a,b) designates the center of the sphere. In this regard, an alternative embodiment of the present invention provides for a prism facet top side that is aspherical in shape.

Figure 24:
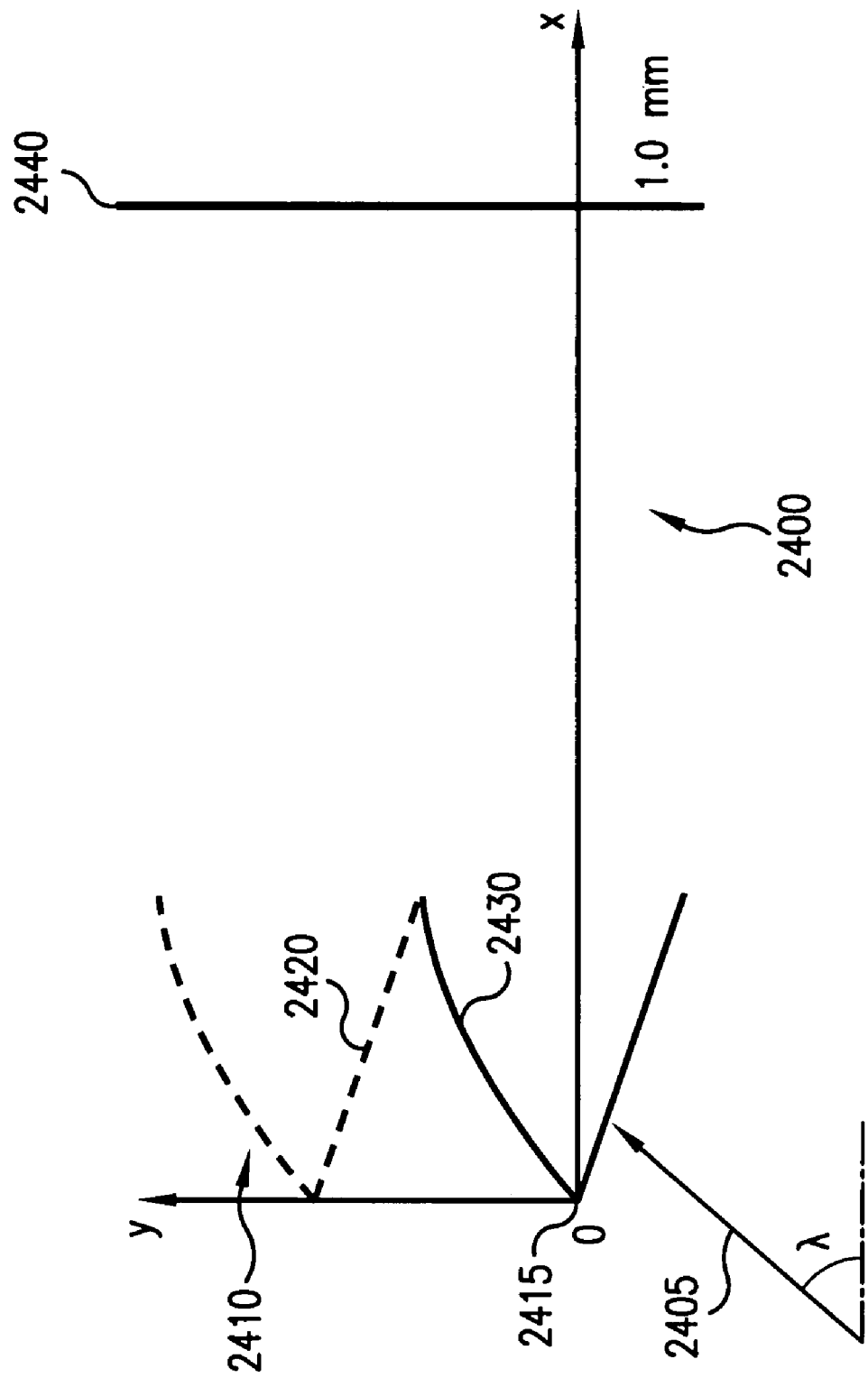
FIG. 24 shows a side cross-sectional view of a fresnel lens with an aspherical convex surface in accordance with an embodiment of the invention.
Figure 26C:
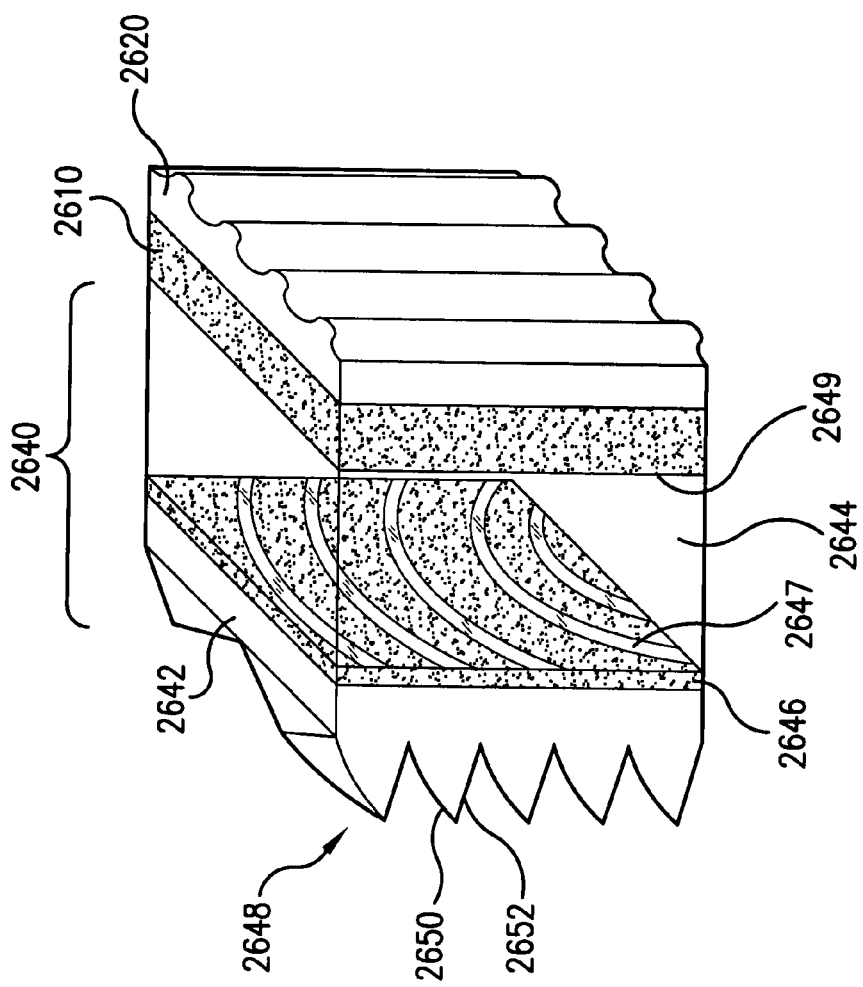
FIG. 26(c) shows a projection assembly including the projection screen of FIG. 26(a) according to an embodiment of the invention.
Figure 26A:
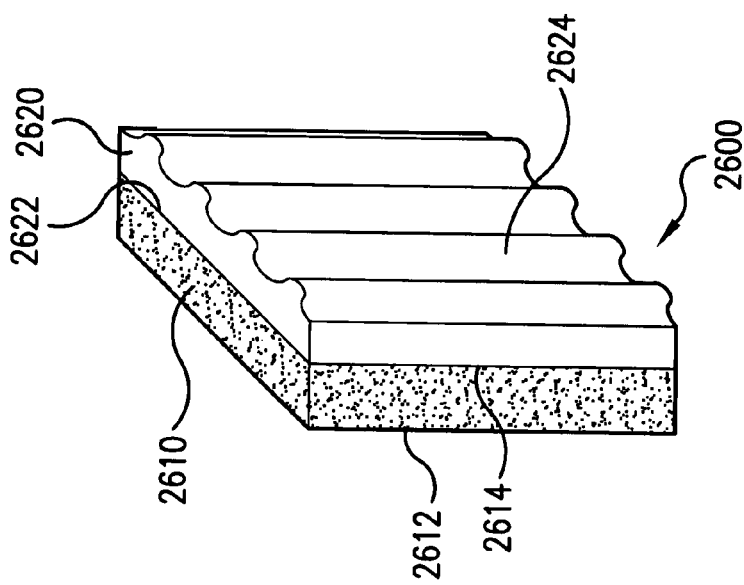
FIG. 26(a) shows a perspective view of a projection screen according to an embodiment of the invention.
Figure 26B:
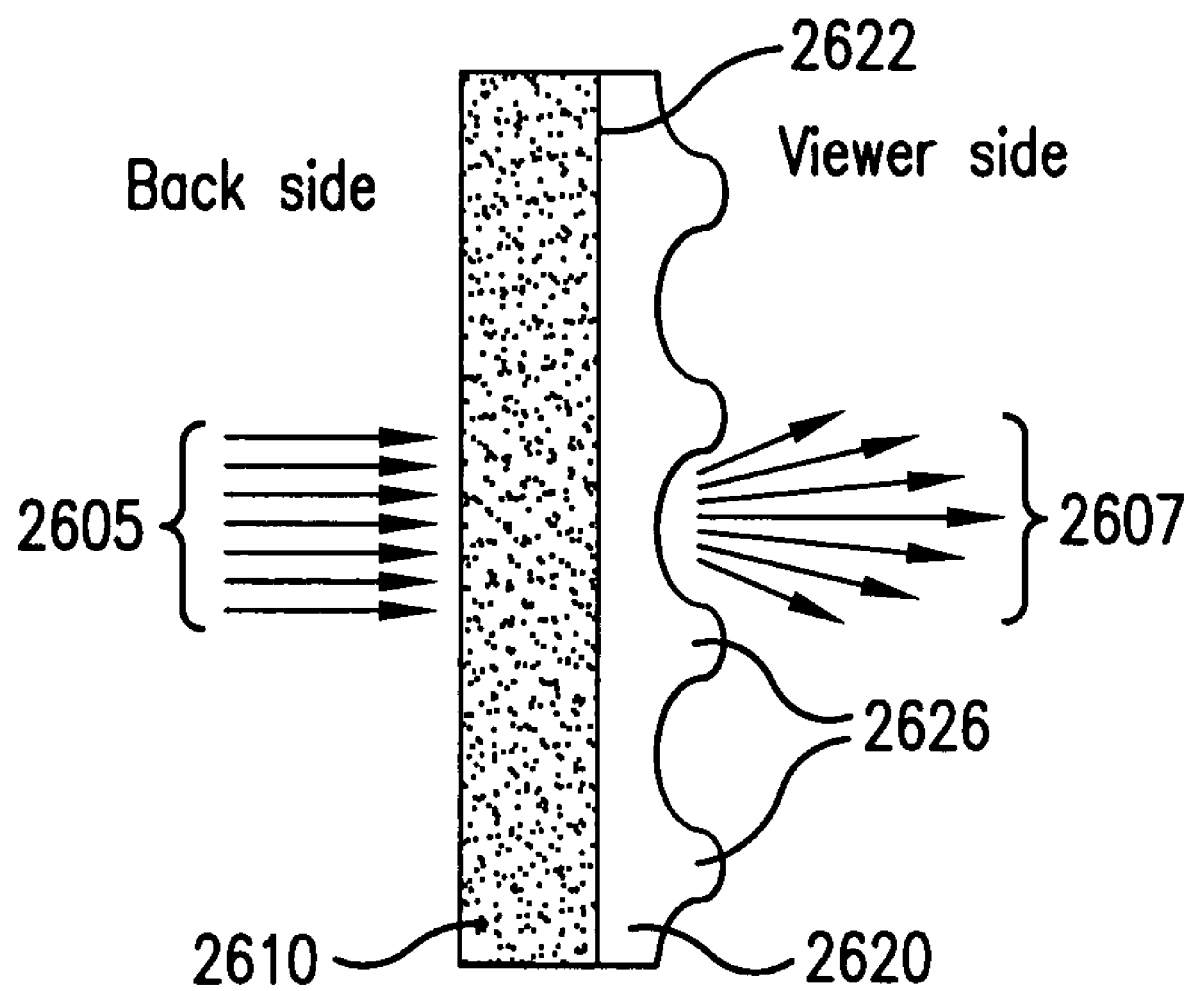
FIG. 26(b) shows a top view of the projection screen of FIG. 26(a).
Figure 26F:
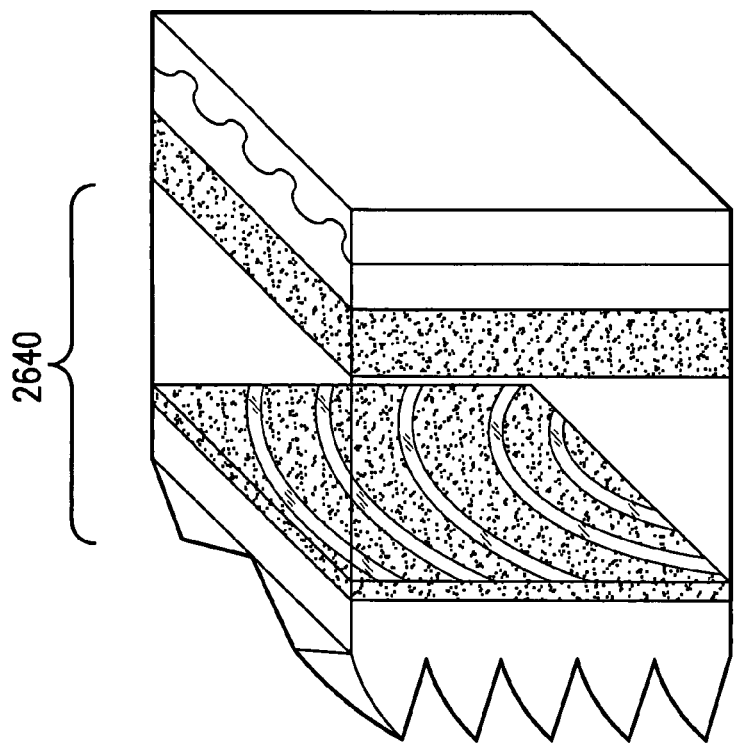
FIG. 26(f) shows a projection assembly including the projection screen of FIG. 26(d) according to another embodiment of the invention.
Figure 26D:
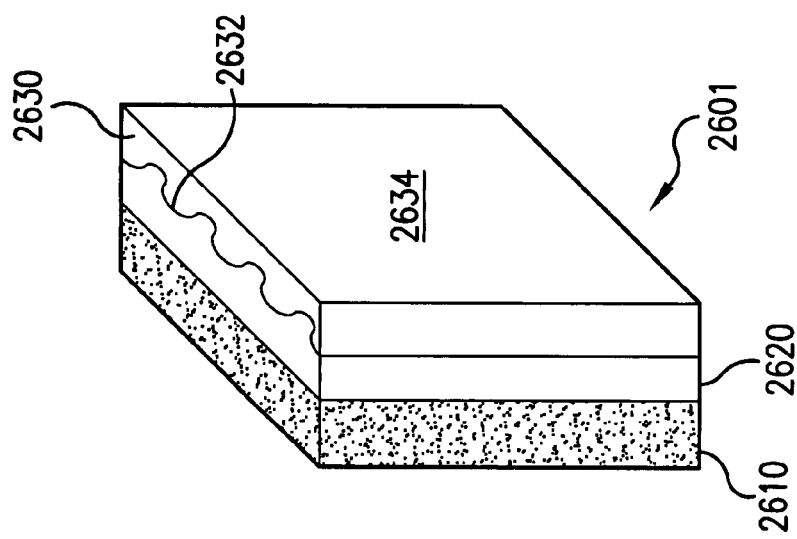
FIG. 26(d) shows a perspective view of a projection screen according to another embodiment of the invention.
Figure 26E:
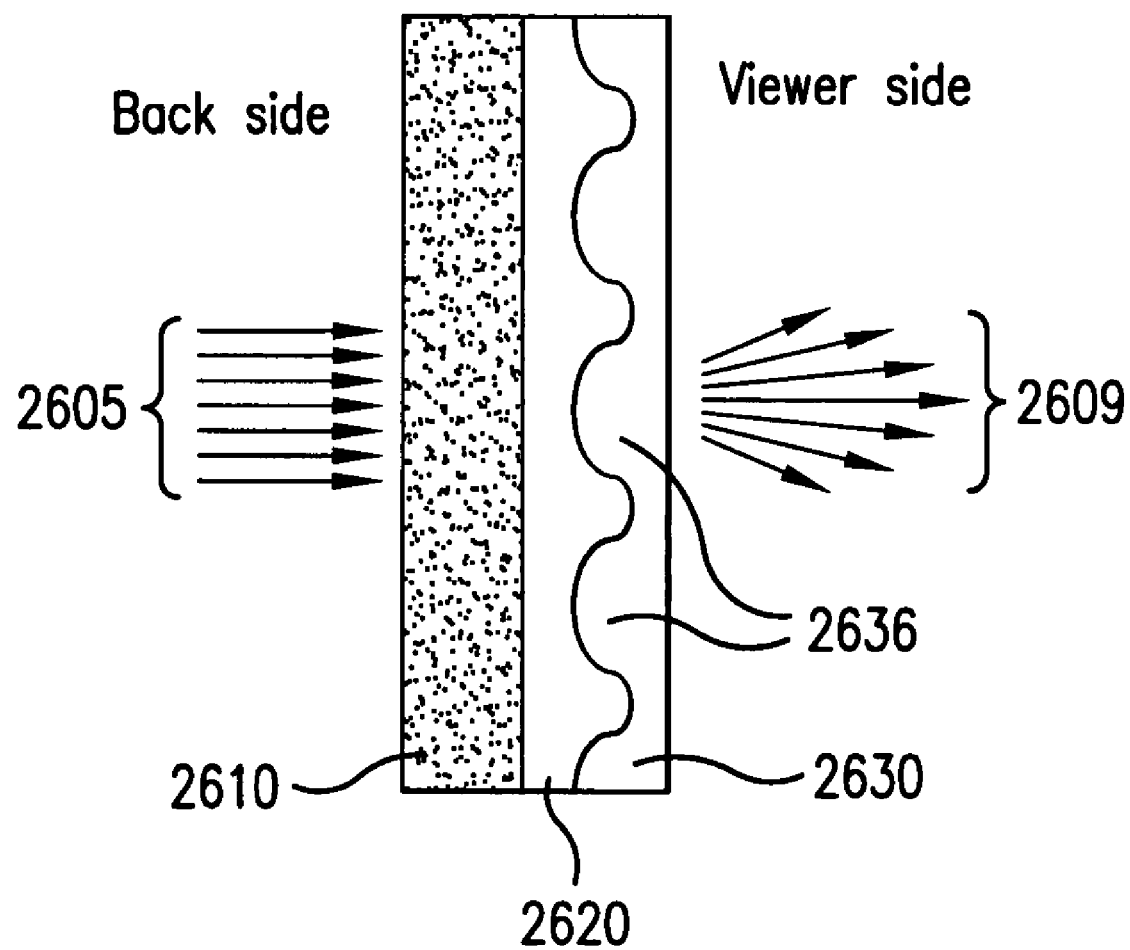
FIG. 26(e) shows a top view of the projection screen of FIG. 26(d).

More specifically, FIG. 24 shows a side cross-sectional view of prism facets 2410 in the X-Y plane of a standard Cartesian coordinate system. As with previous embodiments, the facets 2410 are arranged in concentric rows to form an off-axis, TIR fresnel lens 2400 having an output surface 2440. However, in this embodiment, each facet 2410 has a flat bottom side 2420 and an aspherical convex top side 2430.

As is known, the cross-sectional configuration of the flat bottom side 2420 may be described by $Y=kX$, where k is the slope of the straight line constituting the flat bottom side. The aspherical surface of the top side, however, has a two-dimensional cross-section that is generally described by the fitting equation $Y=a_0+a_1X+a_2X^2+a_3X^3+a_4X^4+\ldots$, where $a_0, a_1, a_2, a_3, a_4, \ldots$ are constants, and X and Y are variables in Cartesian coordinates. In practice, this fitting equation may be used to optimize the aspherical shape of the facet's top side so as to improve the ability of each facet to focus light rays once they have reflected off the top side 2430 of the facet 2410.

In this regard, FIG. 25(a) shows a facet 2510a having a flat bottom side 2520a and a spherical convex top side 2530a, as discussed above in connection with a number of various embodiments. As shown, incident light rays 2505 enter the bottom side of the facet, and are totally internally reflected off the top side 2530a, and then transmitted (through the fresnel lens) through the transparent portion 2555 of a generally opaque layer 2550. It is noted that the physical configuration of the embodiment shown in FIG. 25(a) is generally akin to, e.g., the embodiment shown in FIG. 14(a), with the facet 2510a corresponding generally to the facet 1420, the opaque layer 2550 corresponding generally to the opaque layer 1410, and the (concentric) transparent portion 2555 corresponding generally to concentric transparent portions 1400. However, FIG. 25(a) provides a close-up of the focusing of the reflected light rays 2507a.

As was noted in connection with the embodiment of FIG. 14(a), as well as other embodiments, placement of an opaque layer between the input and output surfaces of the fresnel lens serves to increase contrast by blocking a large amount of ambient light because the area covered by the generally transparent portions 1400 is small compared to the total input surface area, thereby leaving very little available surface area through which ambient light is able to pass. Thus, the better the ability to focus the reflected rays 2507a, the smaller the transparent portion 2555 that is needed, and the higher the blocking efficiency of the opaque layer 2550, which translates into even better contrast.

With the above in mind, although a spherical convex top side 2530a provides for fairly good focusing of the reflected rays, such focusing is not optimal. Thus, as shown in FIG. 25(a) by way of example, of the three incident rays 2505 that are reflected off the top side 2530*a*, two may focus at a first point "A", while one of the two and the remaining third ray may focus at a second point "B". Again, this limits the ability to improve contrast. Just as importantly, however, the inability to focus the light generates an undesirable aberration.

In contrast, FIG. 25(*b*) shows a facet 2510*b* having an optimized aspherical convex top side 2530*b* and a flat bottom side 2520*b*. Here, the reflected rays 2507*b* are focused at a single point "C" within the transparent portion 2555 of the opaque layer 2550. In this regard, in a preferred embodiment, the fitting equation for the top side 2430, 2530*b* of the facet is optimized by setting $a_0=0$, $a_1=0.5475$, $a_2=-0.2694$, $a_3=0.2949$, and $a_4, \ldots =0$. In addition, the bottom side 2420, 2520*b* may be optimized by setting the slope $k=-0.3249$. Moreover, an angle of incidence $\lambda$ of about 42° for the incident rays 2405, 2505 has been found to yield the most optimal results.

As with the embodiment of FIG. 14(*a*), the fresnel lens 2400 shown in FIG. 24 may be a unitary structure (that is then coupled to the projection screen), or it may comprise various lens portions that are themselves coupled to each other. The fresnel lens 2400, or one of the lens portions thereof (e.g., the lens portion including the output surface 2440), may be made of a substrate material, such as clear plastic, generally having a refractive index of between about 1.30 and about 1.60. In a preferred embodiment, the substrate material has a refractive index of about 1.49. Lastly, although in FIG. 24, the thickness of the fresnel lens, i.e., the distance between the prism peak 2415 and the output surface 2440 is shown to be about 1.0 mm, it should be noted that lens thickness may vary (e.g., between about 0.5 mm and about 5.0 mm) depending on the application.

As noted previously, the off-axis TIR fresnel lens according to the various embodiments of the present invention is configured to be connected to a projection screen. In general, optimal connection of such a lens to a projection screen requires that the screen have a substantially flat input side to be coupled to the substantially flat output surface of the fresnel lens. In this regard, FIGS. 26(*a*) and 26(*b*) show one embodiment of such a screen in accordance with the present invention.

Projection screen 2600 includes a diffuser 2610 that has a substantially flat input side 2612 and a substantially flat output side 2614 and is connected to a lenticular lens 2620 having an input side 2622 and an output side 2624. The output side 2614 of the diffuser and the input side 2622 of the lenticular lens are both substantially flat and are connected to one another in such a way as to provide a substantially air-gap-free connection between the two. In a preferred embodiment, the diffuser 2610 and the lenticular lens 2620 may be laminated or extruded together.

FIG. 26(*c*) shows a projection assembly in which an off-axis TIR fresnel lens according to previously-described embodiments of the present invention (see, e.g., FIGS. 14(*a*) and 24) is connected to the projection screen 2600. More specifically, the fresnel lens 2640 includes a first lens portion 2642 including the prism facets 2648, a second lens portion 2644 including the fresnel lens output surface 2649, and an opaque layer 2646 that is sandwiched between the first and second lens portions in such a way as to provide an air-gap-free connection on both sides of the opaque layer 2646. As before, the opaque layer 2646 includes concentric transparent portions 2647 for allowing passage of light from the first lens portion 2642 to the second lens portion 2644. In addition, the facets 2648 are arranged in concentric rows, with each facet having a top side 2650 and a bottom side 2652. In a preferred embodiment, the top side 2650 is aspherical convex, and the bottom side 2652 is flat. However, in embodiments of the invention, the top side may be spherical convex, while the bottom side is flat. In yet other embodiments, each of the top and bottom sides may be aspherical, spherical, or flat.

The output surface 2649 of the fresnel lens 2640 is substantially flat so as to be coupled with the substantially flat input side 2612 of the diffuser 2610 in such a way as to eliminate substantially all air gaps from the connection between the fresnel lens and the projection screen. In embodiments of the invention, such a substantially air-gap-free connection may be achieved by one or more of the following methods: lamination, adhesive bonding, solvent welding, plastics welding, molding, injection molding, co-injection molding, and co-extrusion.

In practice, incident light rays enter each facet 2648 through the bottom side 2652 and undergo total internal reflection off the top side 2650. The reflected rays then travel through the transparent portions 2647 and the second lens portion 2644 to the output surface 2649 of the fresnel lens. As shown in FIG. 26(*b*), the rays (indicated for illustrative purposes by the reference numeral 2605) then enter the input side 2612 of the diffuser 2610, are diffused therein, and pass to the input side 2622 of the lenticular lens 2620.

The output side 2624 of the lenticular lens includes a plurality of vertical lens arrays 2626. In general, the output side of the lenticular lens 2620 may have various shapes, such as, e.g., concave, convex, sinusoidal, etc. In a preferred embodiment, however, the output side 2624 is concave, which reduces reflection loss, including total internal reflection loss, thereby maximizing transmission of light. In this way, the diffused light that exits the output side 2614 of the diffuser and enters the input side 2622 of the lenticular lens is bent horizontally as it exits the output side of the lenticular lens (see rays 2607 in FIG. 26(*b*)). Thus, the projection assembly may provide for a horizontal viewing angle that is larger than the vertical viewing angle.

It is noted that the lenticular lens 2620 may be generally made of a material with a refractive index of at least 1.3. In the preferred embodiment, the refractive index of the lenticular lens may be about 1.586.

In an alternative embodiment shown in FIGS. 26(*d*)-26(*f*), in addition to the diffuser 2610 and the lenticular lens 2620, the projection screen 2601 includes a second lenticular lens 2630 that is connected to the first lenticular lens 2620. More specifically, the input side 2632 of the second lenticular lens 2630 includes a plurality of vertical lens arrays 2636, and the output side 2624 of the first lenticular lens 2620 and the input side 2632 of the second lenticular lens 2630 have complementary shapes so as to be matingly connectable to one another. As before, the output side of the first lenticular lens and the input side of the second lenticular lens are coupled so as to have substantially no air gaps between the two lenticular lenses. Additionally, the output side 2634 of the second lenticular lens is preferably substantially flat, so as to provide a flat screen on the viewer's side. As noted previously, such a flat screen is less susceptible to damage, and facilitates handling, cleaning, and maintenance.

As shown in FIG. 26(*f*), the projection screen 2601 may be connected to the fresnel lens 2640 in the manner described above in connection with FIGS. 26(*a*)-26(*c*). Here, again, light rays 2605 enter the diffuser, are diffused, enter the first lenticular lens 2620, where they are bent horizontally, and then enter the second lenticular lens through the input side 2632. In this case, however, the rays 2609 exiting the output surface 2634 of the second lenticular lens have undergone an additional amount of horizontal bending at the flat output surface 2634.

It is noted that, in embodiments of the invention, the two lenticular lenses are made of materials that have different refractive indexes. In preferred embodiments, the refractive index of the material of the second lenticular lens 2630 is lower than that of the material of the first lenticular lens 2620. In a specific example, the first lenticular lens has a refractive index of about 1.586, and the second lenticular lens has a refractive index of 1.39.

Figure 27C:
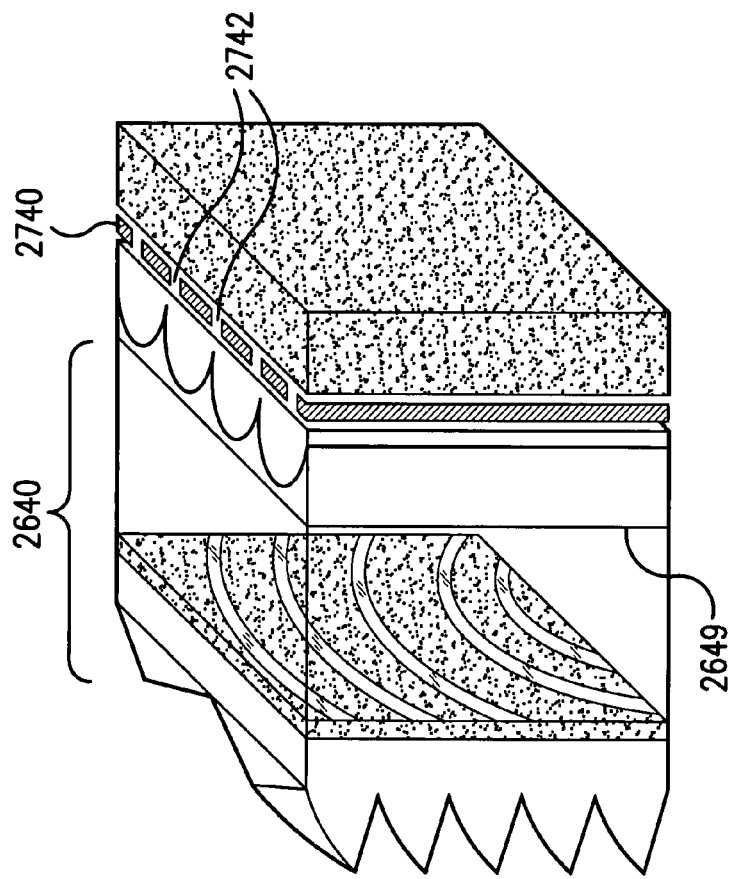
FIG. 27(c) shows a projection assembly including the projection screen of FIG. 27(a) according to another embodiment of the invention.
Figure 27A:
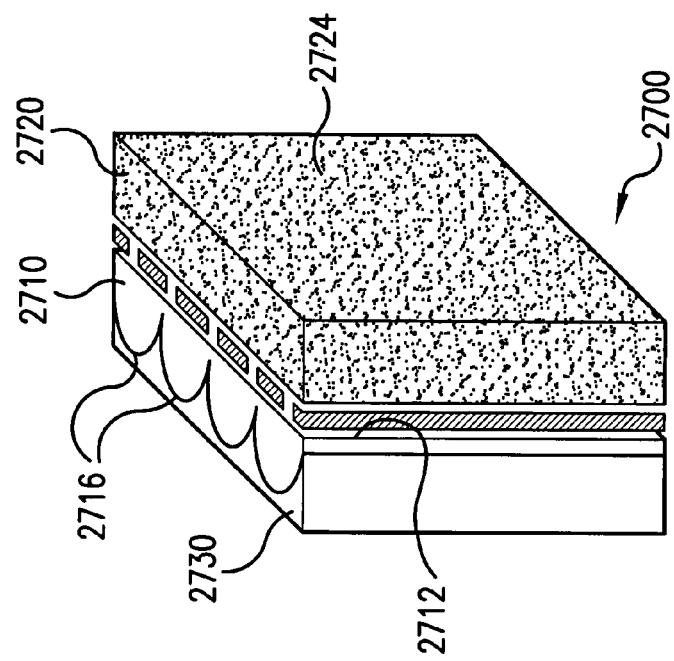
FIG. 27(a) shows a perspective view of a projection screen according to another embodiment of the invention.
Figure 27B:
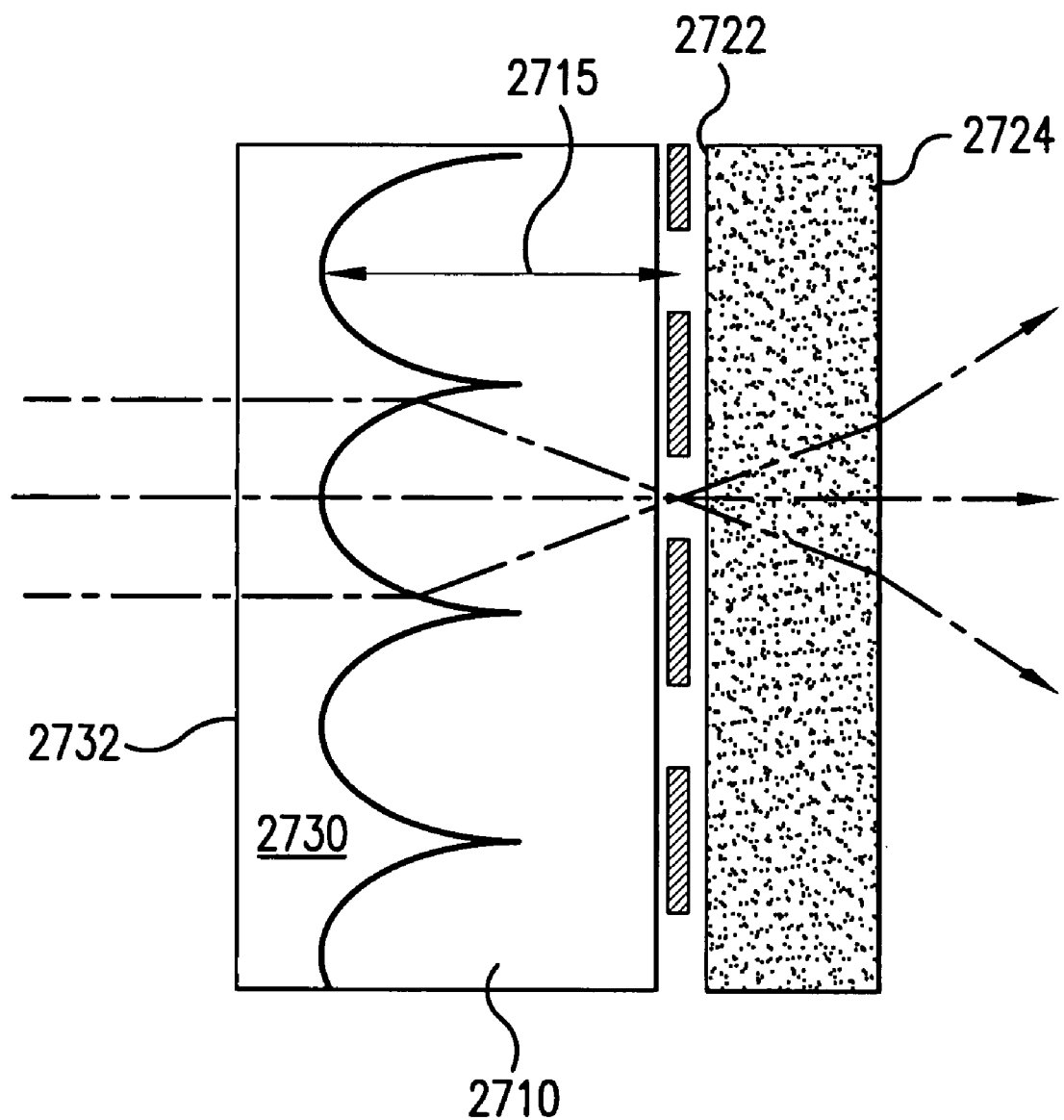
FIG. 27(b) shows a top view of the projection screen of FIG. 27(a).

FIGS. 27(*a*)-27(*c*) show an alternative embodiment of the a projection screen according to the present invention. Projection screen 2700 includes a lenticular lens 2710 having a plurality of vertical lens arrays 2716 on its input side, a diffuser 2720 having an input side 2722 that receives light transmitted from the lenticular lens' output side 2712, and a clear layer of material 2730 having a first side 2732 for receiving light and an opposing second side that overlays the input side of the lenticular lens 2710. As will be noted, the clear layer 2730 provides a substantially flat surface 2732 for connection to the output surface 2649 of the fresnel lens 2640. As with other connections, the input side of the lenticular lens 2710 is coupled to the clear layer 2730 in such a way as to provide a substantially air-gap-free connection therebetween.

The projection screen 2700 may also include a generally opaque layer 2740 that is disposed between the output side 2712 of the lenticular lens 2710 and the input side 2722 of the diffuser 2720 in order to block outside ambient light and, therefore, improve contrast on the viewer's side. The opaque layer 2740 includes transparent portions 2742 that are generally vertical and parallel to one another and allow passage of light from the lenticular lens to the diffuser. When the projection screen 2700 includes the opaque layer 2740, the latter is connected to the output side 2712 of the lenticular lens on one side, and the input side 2722 of the diffuser 2720 on its other side. In embodiments that do not include the opaque layer 2740, the output side 2712 of the lenticular is connected directly to the input side 2722 of the diffuser 2720. In either case, the connections are made so as to include substantially no air gaps.

In a preferred embodiment, the lenticular lens 2710 is made of a material that has a larger refractive index than the refractive index of the clear layer, and the output side 2724 of the diffuser is substantially flat so as to provide a flat screen on the viewer's side. It is also noted that, because the incident surface, i.e., the input side 2732 of the clear layer has a higher refractive index than air, which would normally occupy the space adjacent the input side of the lenticular lens 2710, the bending of light that is incident on the input side 2732 is reduced. This, in turn, requires a longer focal length 2715 than would be required in existing lenticular lenses. Therefore, in order to preserve, to the extent possible, the "normal" focal length, the lens arrays 2726 must have a sharper configuration than the lens arrays of normal, existing lenticular lenses. As such, in embodiments of the present invention, the lens arrays may have a substantially elliptical, as opposed to completely circular, cross-section. That is, as shown in FIG. 27(*b*), the cross-sectional configuration of the lens arrays may be semi-elliptical, as opposed to semi-circular.

Although the present invention has been described in considerable detail with reference to certain preferred embodiments, many additional alternatives, modifications, and variations will be apparent to those skilled in the art and in light of the description herein. Accordingly, it is intended that the appended claims cover any and all such alternatives, modifications, and variations that fall within the spirit thereof, as well as all of the embodiments disclosed and suggested herein and any equivalents thereof.

What is claimed is:

1. A projection assembly comprising:
   (a) an off-axis fresnel lens comprising:
      a lens having an input surface on a first side and an output surface on a second side; and
      a plurality of outwardly-extending, total-internal-reflection type prism facets disposed on the input surface in concentric rows, each facet having a top side and a bottom side that intersect to form a prism peak;
   (b) a lenticular lens having an input side and an opposing output side, said input side including a plurality of vertical lens arrays and said lenticular lens being made of a material having a first refractive index;
   (c) a diffuser having an input side and an opposing output side, said input side receiving light transmitted from the lenticular lens' output side; and
   (d) a clear layer of material having a second refractive index, said clear layer having a first side for receiving light from the output surface of the fresnel lens and an opposing second side that overlays the input side of the lenticular lens.

2. The projection assembly of claim 1, wherein the top side of each said facet of the fresnel lens is spherical convex or flat.

3. The projection assembly of claim 1, wherein the input side of the lenticular lens is coupled to the clear layer's second side in such a way as to provide a substantially air-gap-free connection therebetween.

4. The projection assembly of claim 1, wherein the first refractive index is larger than the second refractive index.

5. The projection assembly of claim 1, wherein the input and output sides of the diffuser, the output side of the lenticular lens, and the first side of the clear layer are substantially flat.

6. The projection assembly of claim 1, further including a generally opaque layer, said opaque layer being disposed between the output side of the lenticular lens and the input side of the diffuser and including transparent portions to allow passage of light from the lenticular lens to the diffuser.

7. The projection assembly of claim 6, wherein said transparent portions are vertical and parallel to one another.

8. The projection assembly of claim 6, wherein the generally opaque layer is coupled to the lenticular lens and the diffuser in such a way as to provide a substantially air-gap-free connection with the lenticular lens and the diffuser.

9. The projection assembly of claim 1, wherein said vertical lens arrays have a substantially elliptical cross-section.

10. A projection assembly comprising:
   (a) an off-axis fresnel lens comprising:
      a lens having an input surface on a first side and an output surface on a second side; and
      a plurality of outwardly-extending, total-internal-reflection type prism facets disposed on the input surface in concentric rows, each facet having a top side and a bottom side that intersect to form a prism peak;
   (b) a lenticular lens having an input side and an opposing output side, said input side including a plurality of vertical lens arrays and said lenticular lens being made of a material having a first refractive index;
   (c) a diffuser having an input side and an opposing output side, said input side receiving light transmitted from the lenticular lens' output side;
   (d) a clear layer of material having a second refractive index, said clear layer having a first side for receiving light from the output surface of the fresnel lens and an opposing second side that overlays the input side of the lenticular lens; and (e) a generally opaque layer disposed between the input and output surfaces of the fresnel lens, said layer including concentric transparent portions to allow passage of light therethrough.

11. The projection assembly of claim 10, wherein the generally opaque layer is sandwiched between a first fresnel lens portion including the prism facets and a second fresnel lens portion including the output surface, said generally opaque layer being coupled to the first and second fresnel lens portions in such a way as to provide a substantially air-gap-free connection with said fresnel lens portions.

* * * * *